(12) United States Patent
Last et al.

(10) Patent No.: US 10,207,671 B2
(45) Date of Patent: Feb. 19, 2019

(54) HYBRID INFLATOR WITH FOAM AS A FUEL

(71) Applicant: TRW Airbag Systems GmbH, Aschau am Inn (DE)

(72) Inventors: Detlef Last, Muhldorf (DE); Ruckdeschel Rolf, Heldenstein (DE)

(73) Assignee: TRW AIRBAG SYSTEMS GmbH (DE)

( * ) Notice: Subject to any disclaimer, the term of this patent is extended or adjusted under 35 U.S.C. 154(b) by 0 days.

(21) Appl. No.: 15/355,165

(22) Filed: Nov. 18, 2016

(65) Prior Publication Data

US 2018/0141514 A1 May 24, 2018

(51) Int. Cl.
*B60R 21/272* (2006.01)
*B60R 21/264* (2006.01)
*B60R 21/274* (2011.01)
*C06D 5/10* (2006.01)

(52) U.S. Cl.
CPC ........ *B60R 21/272* (2013.01); *B60R 21/2644* (2013.01); *B60R 21/274* (2013.01); *C06D 5/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,480,185 | A * | 1/1996 | Lowe | B60R 21/26 280/740 |
| 5,649,720 | A * | 7/1997 | Rink | B60R 21/264 102/531 |
| 5,669,629 | A | 9/1997 | Rink | |
| 5,979,936 | A * | 11/1999 | Moore | B60R 21/261 280/736 |
| 6,010,153 | A * | 1/2000 | Halas | B60R 21/272 137/68.13 |
| 6,095,556 | A * | 8/2000 | Bailey | B60R 21/272 102/204 |
| 6,116,642 | A * | 9/2000 | Shirk | B60R 21/264 280/736 |
| 6,238,500 | B1 | 5/2001 | Blomquist | |

(Continued)

FOREIGN PATENT DOCUMENTS

| | | | | |
|---|---|---|---|---|
| DE | 19951672 A1 * | 5/2001 | ......... | B60R 21/272 |
| WO | 9932334 | 7/1999 | | |
| WO | WO-0142047 A2 * | 6/2001 | ......... | B60R 21/272 |

*Primary Examiner* — Nicole T Verley
(74) *Attorney, Agent, or Firm* — Tarolli, Sundheim, Covell & Tummino LLP

(57) ABSTRACT

An inflator (10) is actuatable to provide inflation fluid for inflating an inflatable vehicle occupant protection device. The inflator (10) includes a volume of stored gas and a propellant (52) that is ignitable to undergo a reaction that produces reaction products. The reaction products include heat and gas that mix with the stored gas to produce a mixture of inflation fluid. The inflator (10) is configured to discharge the inflation fluid to inflate the protection device. The propellant (52) comprises an open cell foam fuel propellant (140). The reaction includes a combustion reaction in which the foam fuel propellant (140) reacts with a gas oxidizer comprising oxygen to produce heat and gas reaction products that mix with the stored gas.

38 Claims, 18 Drawing Sheets

(56) References Cited

U.S. PATENT DOCUMENTS

| | | | | |
|---|---|---|---|---|
| 6,340,175 B1* | 1/2002 | Hughes | ................... | C06B 45/00 102/202.5 |
| 6,553,914 B2* | 4/2003 | Hosey | ................... | B60R 21/272 102/202.14 |
| 7,108,281 B2* | 9/2006 | Butler | ................... | B60R 21/272 137/519.5 |
| 7,726,686 B2* | 6/2010 | Warren | ................ | B60R 21/268 102/531 |
| 8,235,417 B2* | 8/2012 | Warren | ................ | B60R 21/274 280/737 |
| 2002/0158455 A1* | 10/2002 | Bergerson | ............. | B60R 21/264 280/737 |
| 2003/0226468 A1* | 12/2003 | Shilliday | ........... | B60R 21/23138 102/531 |
| 2005/0146123 A1 | 7/2005 | Bergmann et al. | | |
| 2005/0230950 A1* | 10/2005 | Fischer | ................ | B60R 21/272 280/737 |
| 2005/0275203 A1* | 12/2005 | Yano | .................... | B60R 21/272 280/737 |
| 2006/0037797 A1* | 2/2006 | Mathon | .................. | B62K 11/04 180/219 |
| 2006/0091660 A1* | 5/2006 | Lang | ..................... | B60R 21/272 280/737 |
| 2007/0085309 A1* | 4/2007 | Kelley | .................. | B60R 21/272 280/736 |
| 2007/0267855 A1* | 11/2007 | Lewis | ................. | B60R 21/2338 280/739 |
| 2008/0169630 A1* | 7/2008 | Herget | .................. | B60R 21/272 280/741 |
| 2009/0313821 A1* | 12/2009 | Asanuma | ............. | B60R 21/268 29/888 |
| 2010/0269726 A1* | 10/2010 | Jung | ..................... | B60R 21/272 102/530 |
| 2012/0187667 A1* | 7/2012 | Jung | ..................... | B60R 21/272 280/737 |
| 2015/0158455 A1* | 6/2015 | Ruckdeschel | ......... | B60R 21/264 280/741 |
| 2017/0166162 A1* | 6/2017 | Last | ...................... | B60R 21/264 |
| 2017/0232923 A1* | 8/2017 | Ebner | .................. | B60R 21/272 280/741 |

* cited by examiner

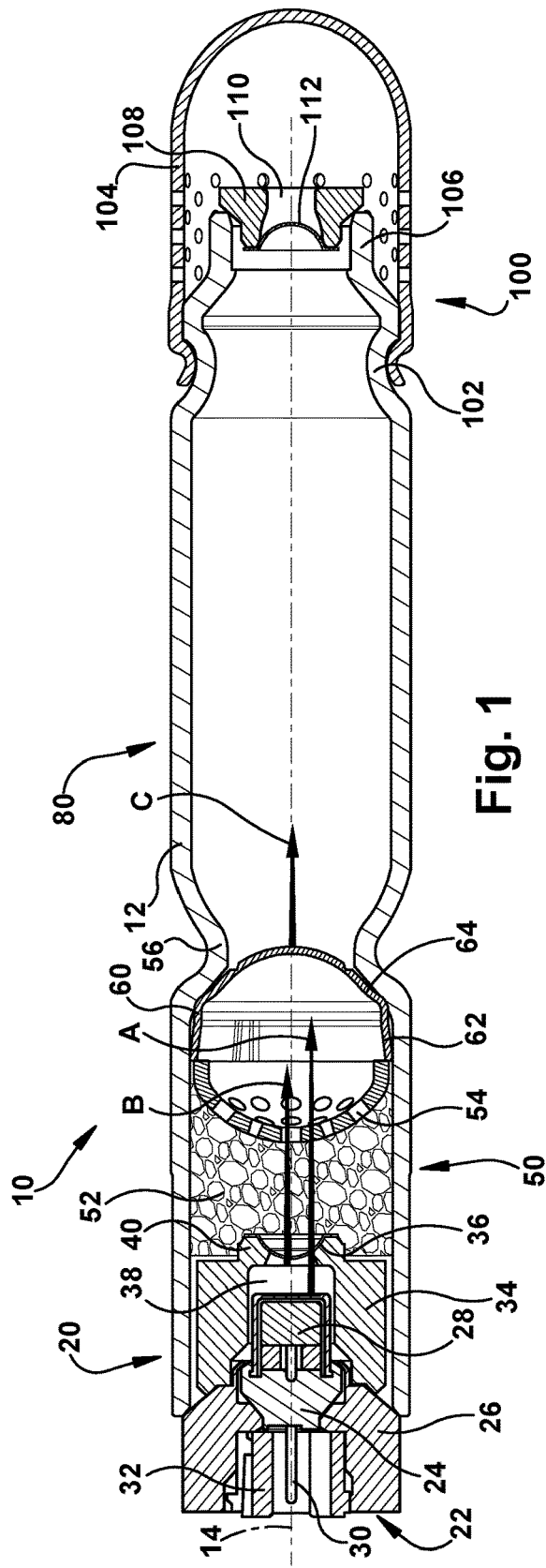

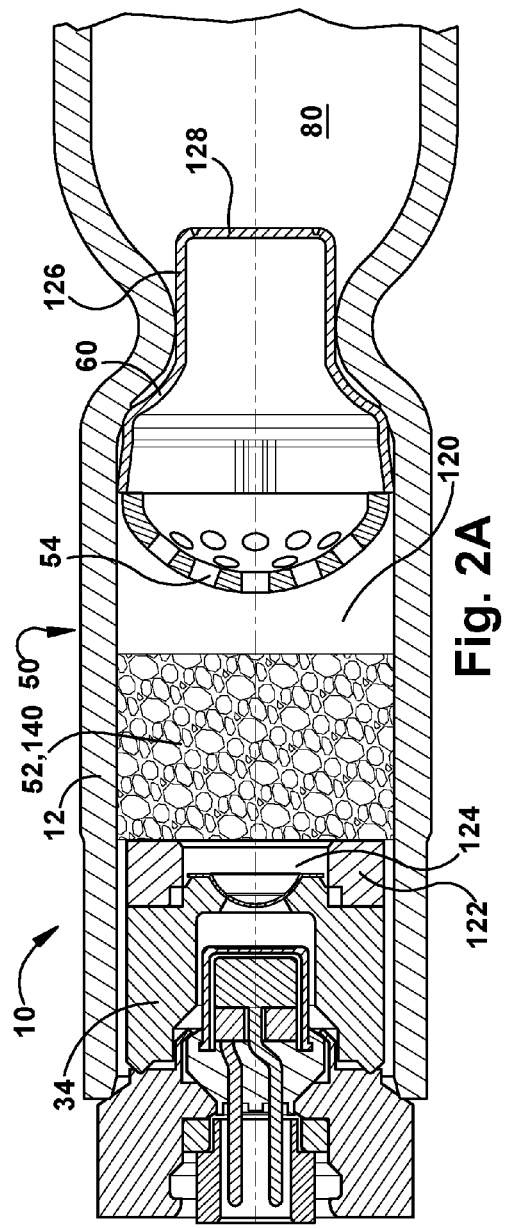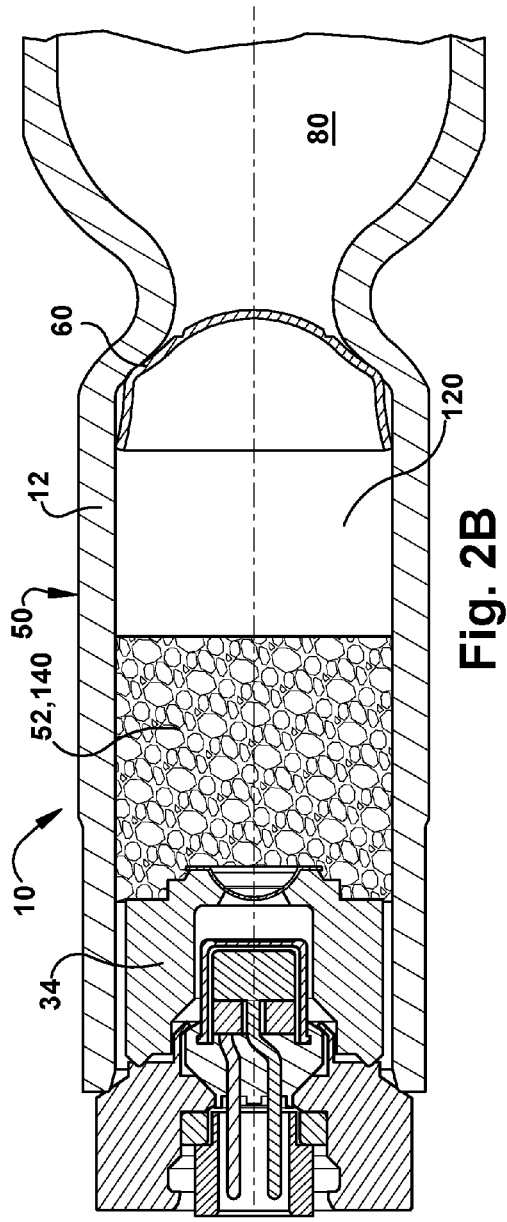

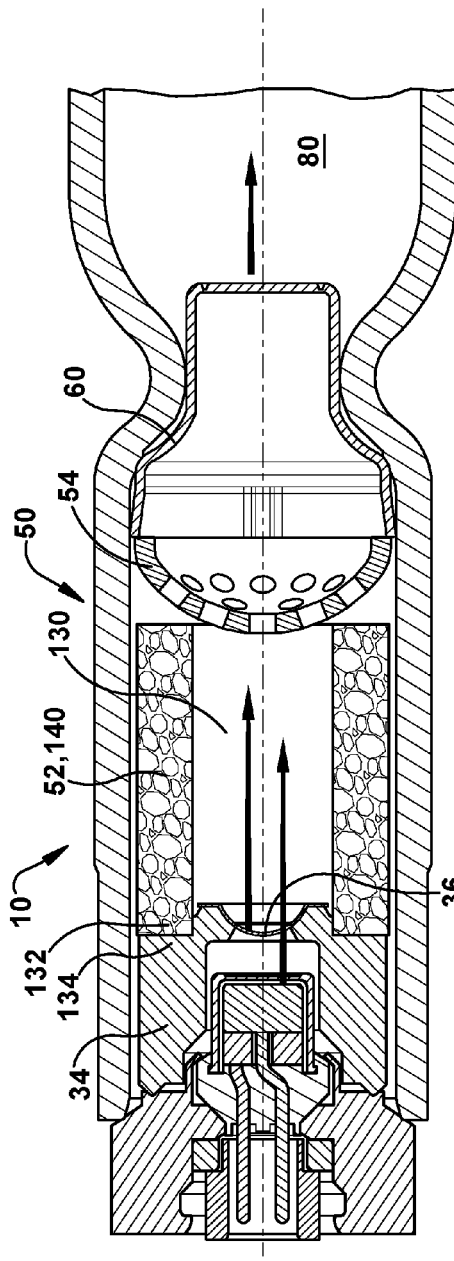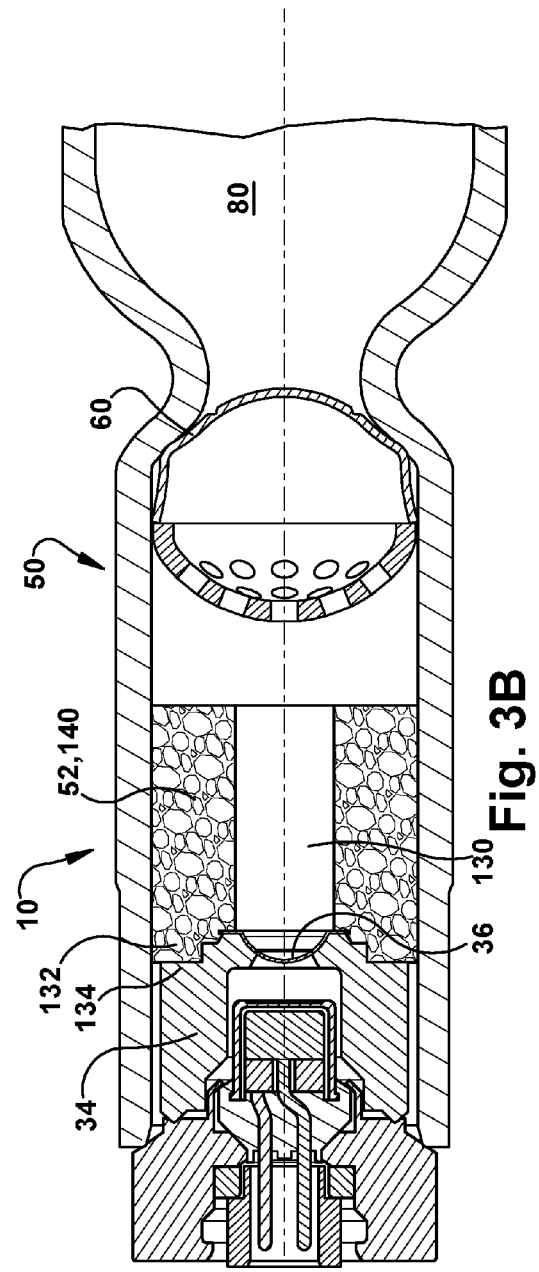

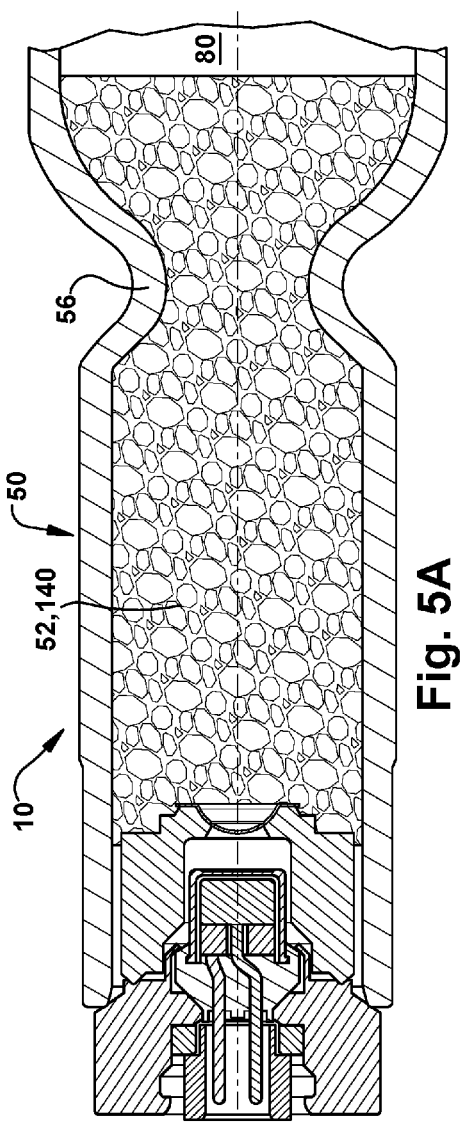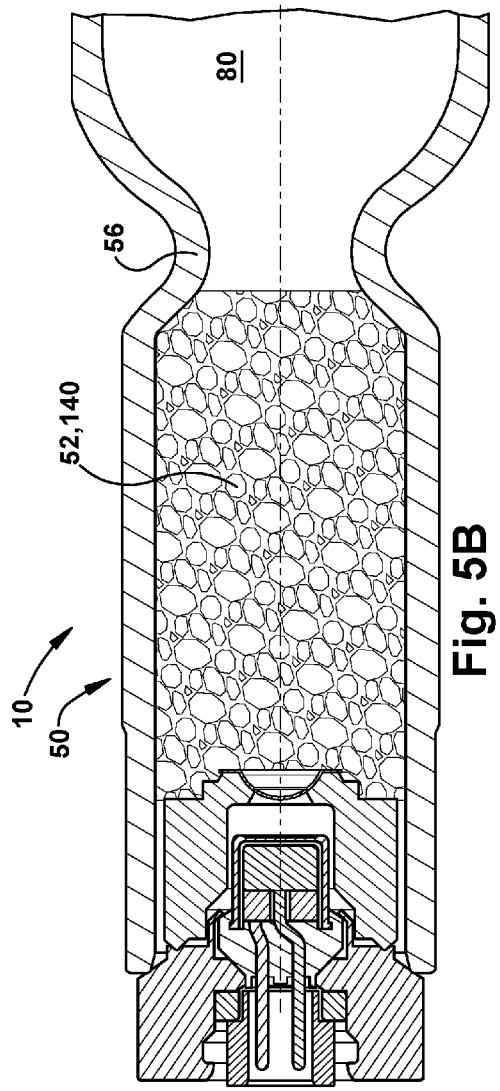

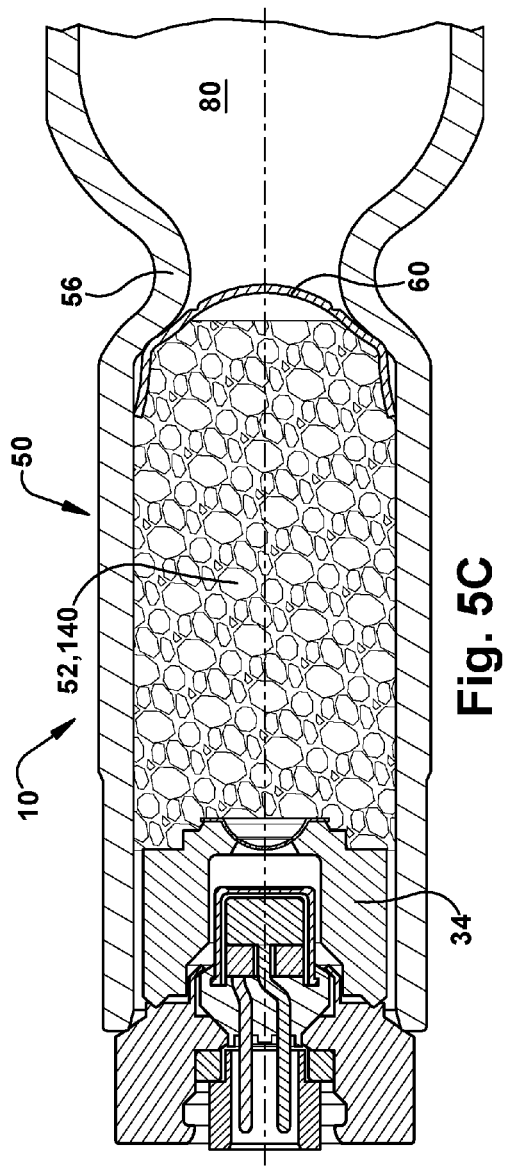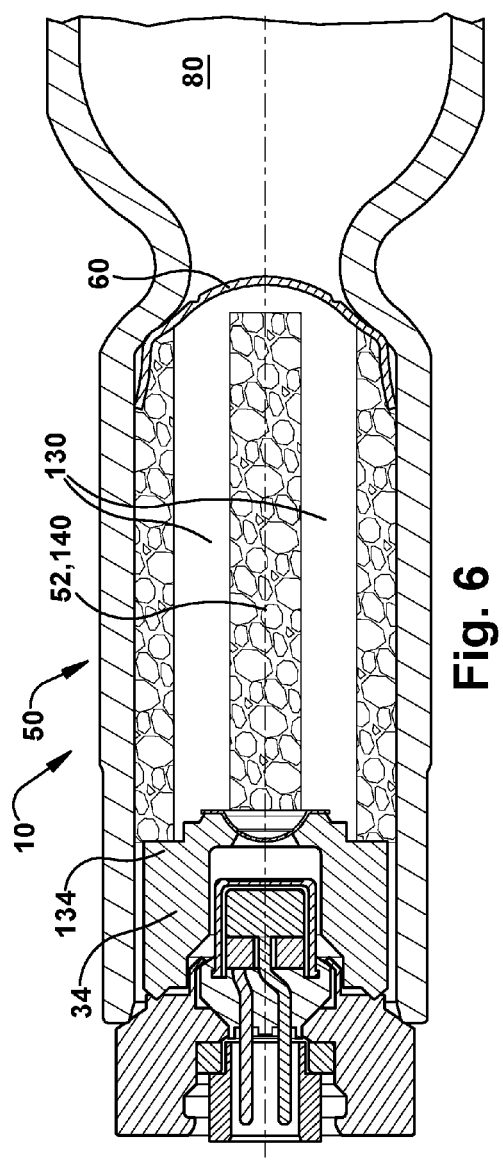

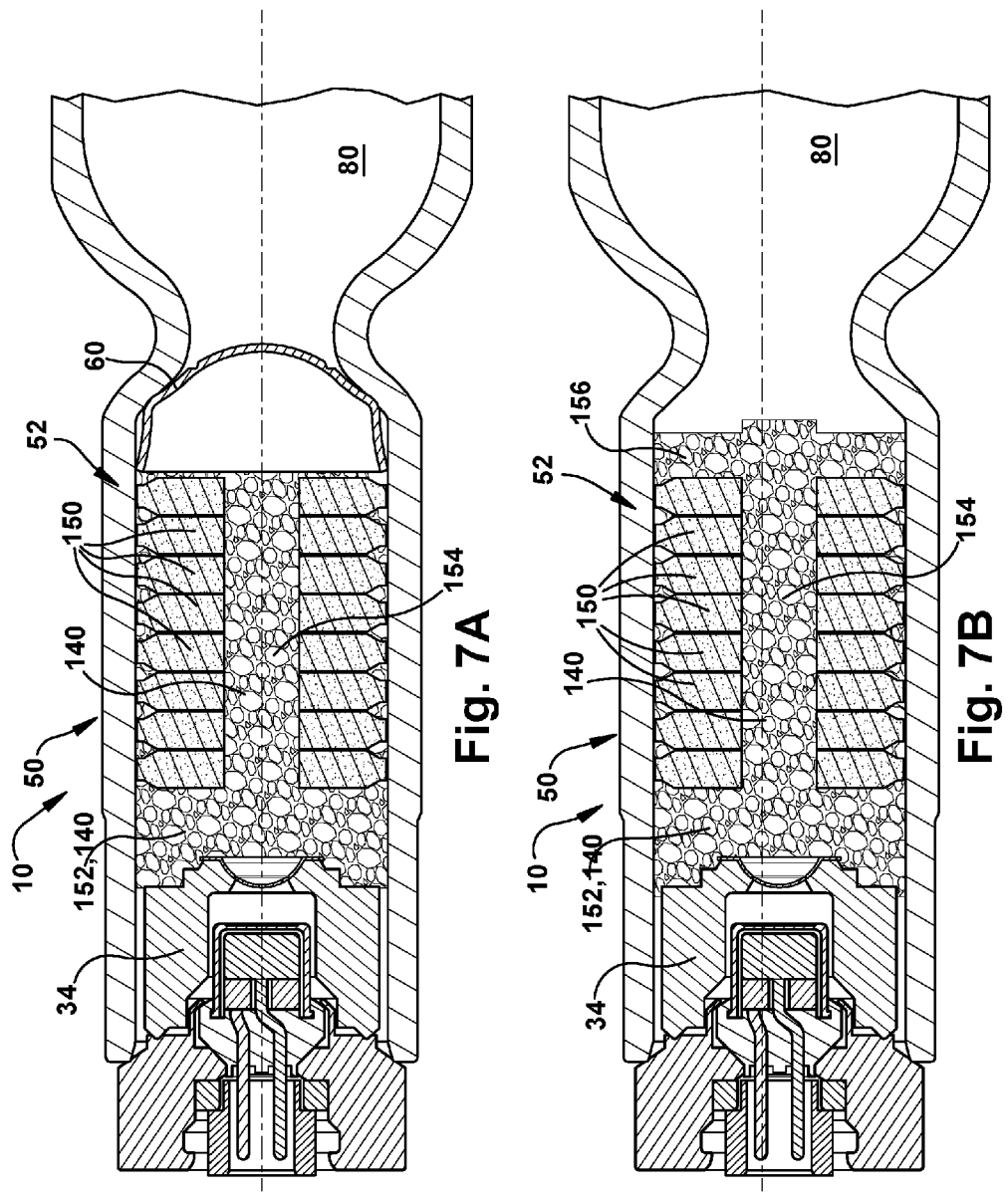

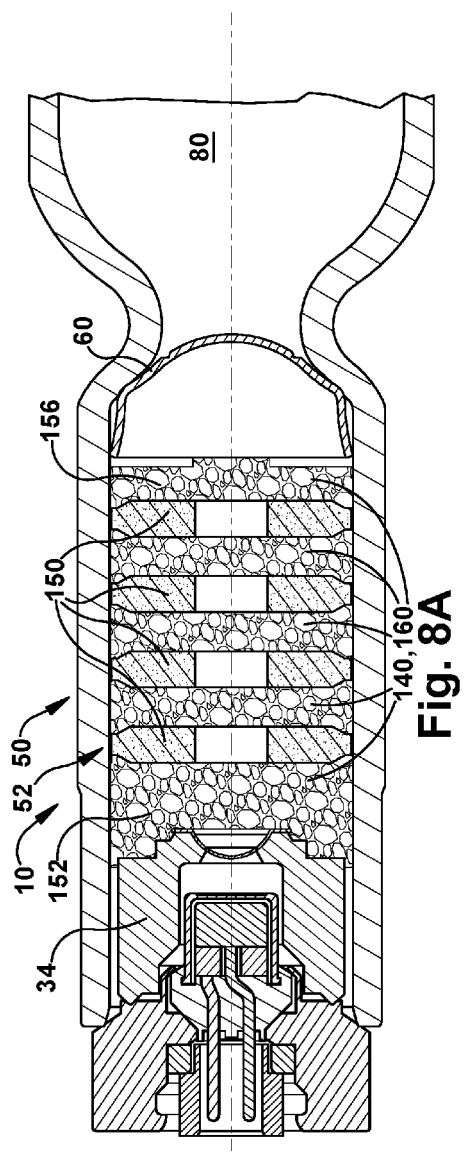
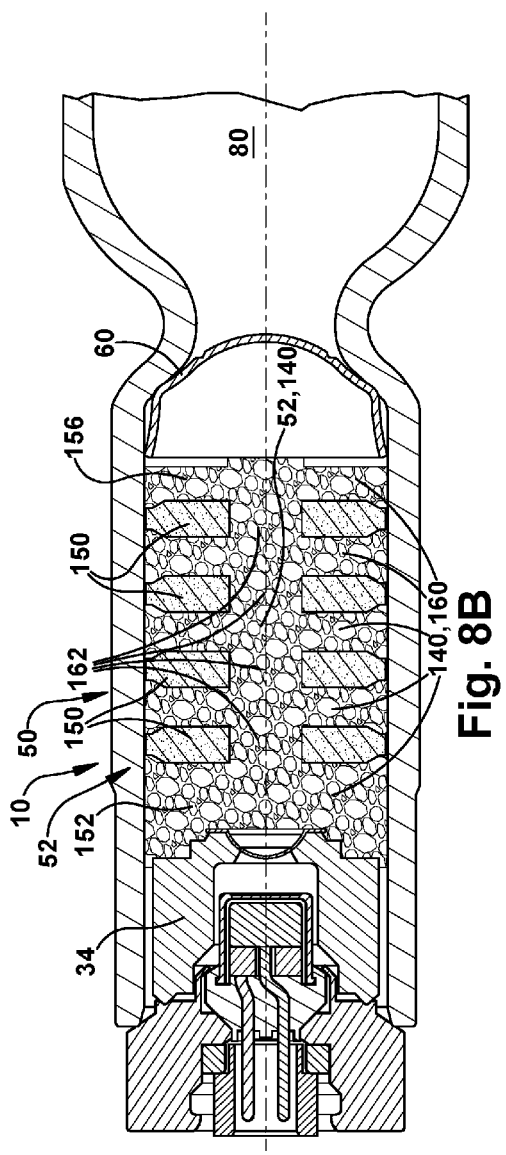

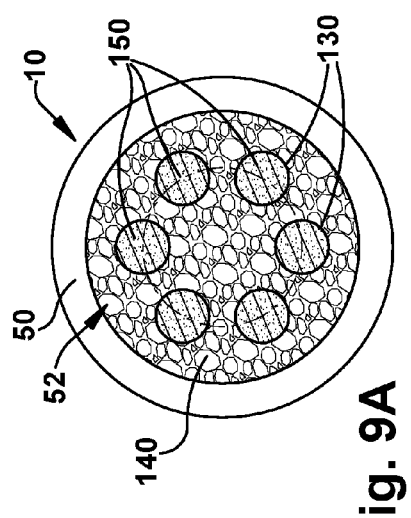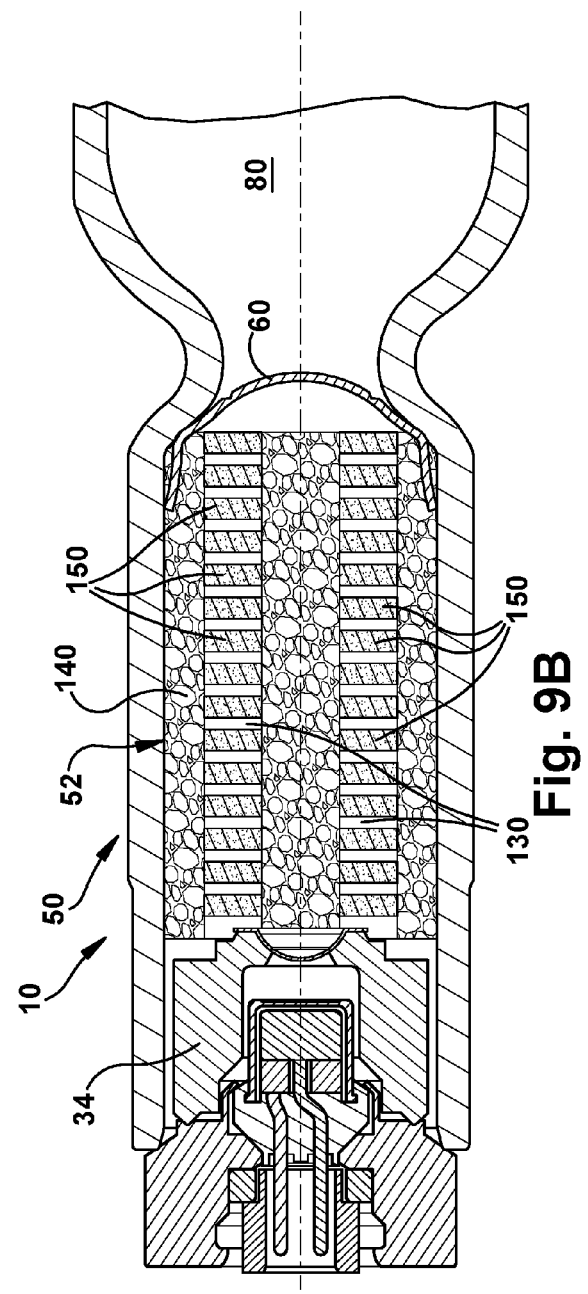

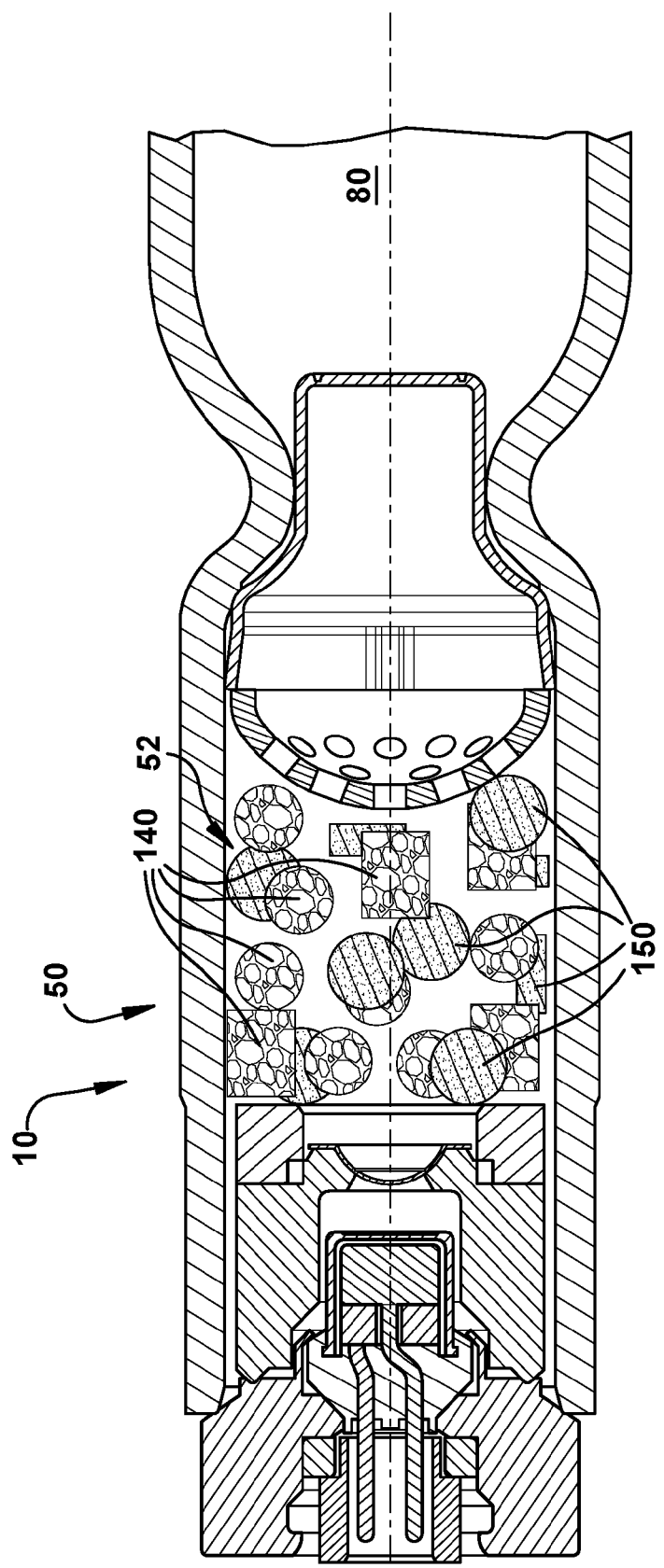

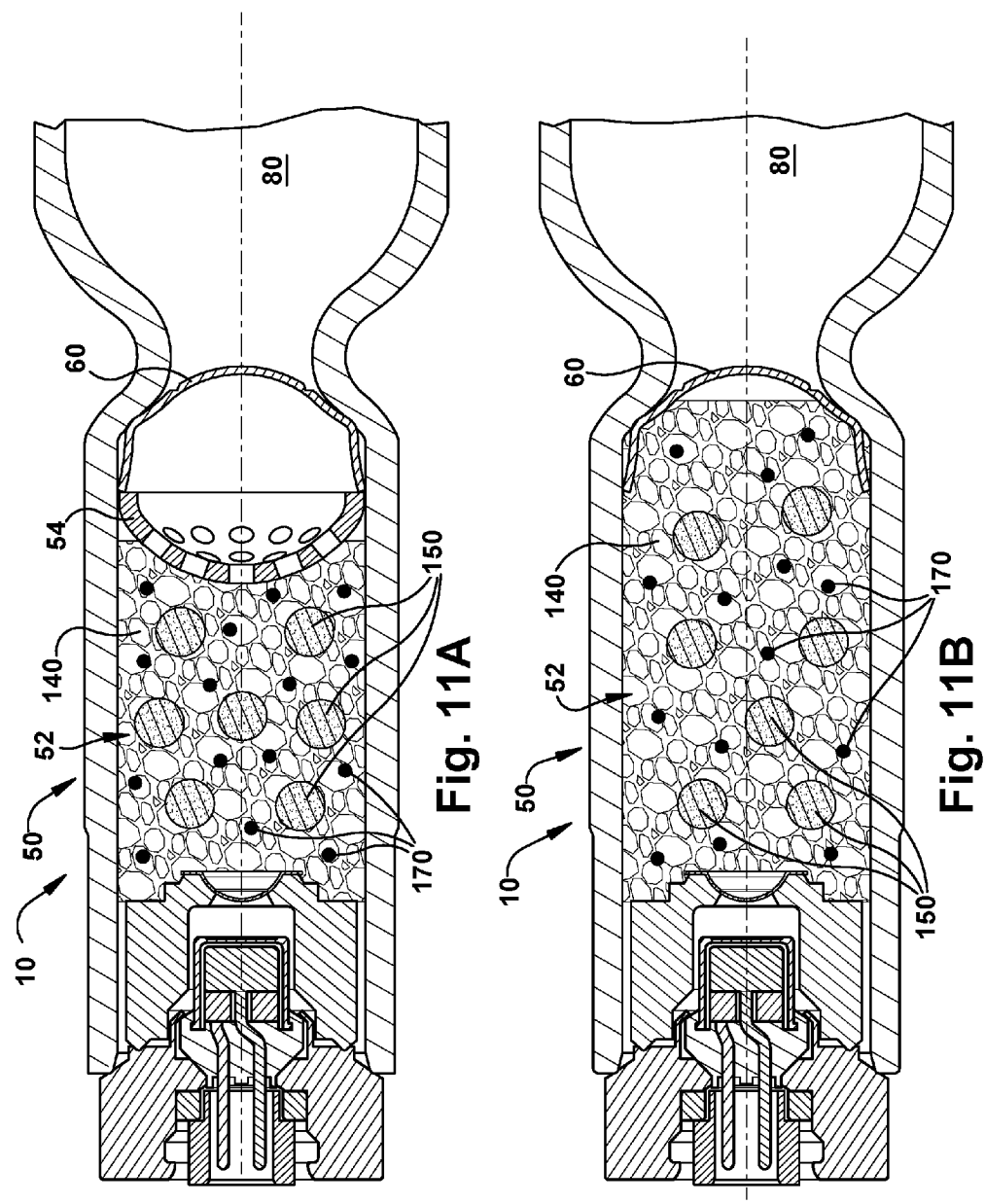

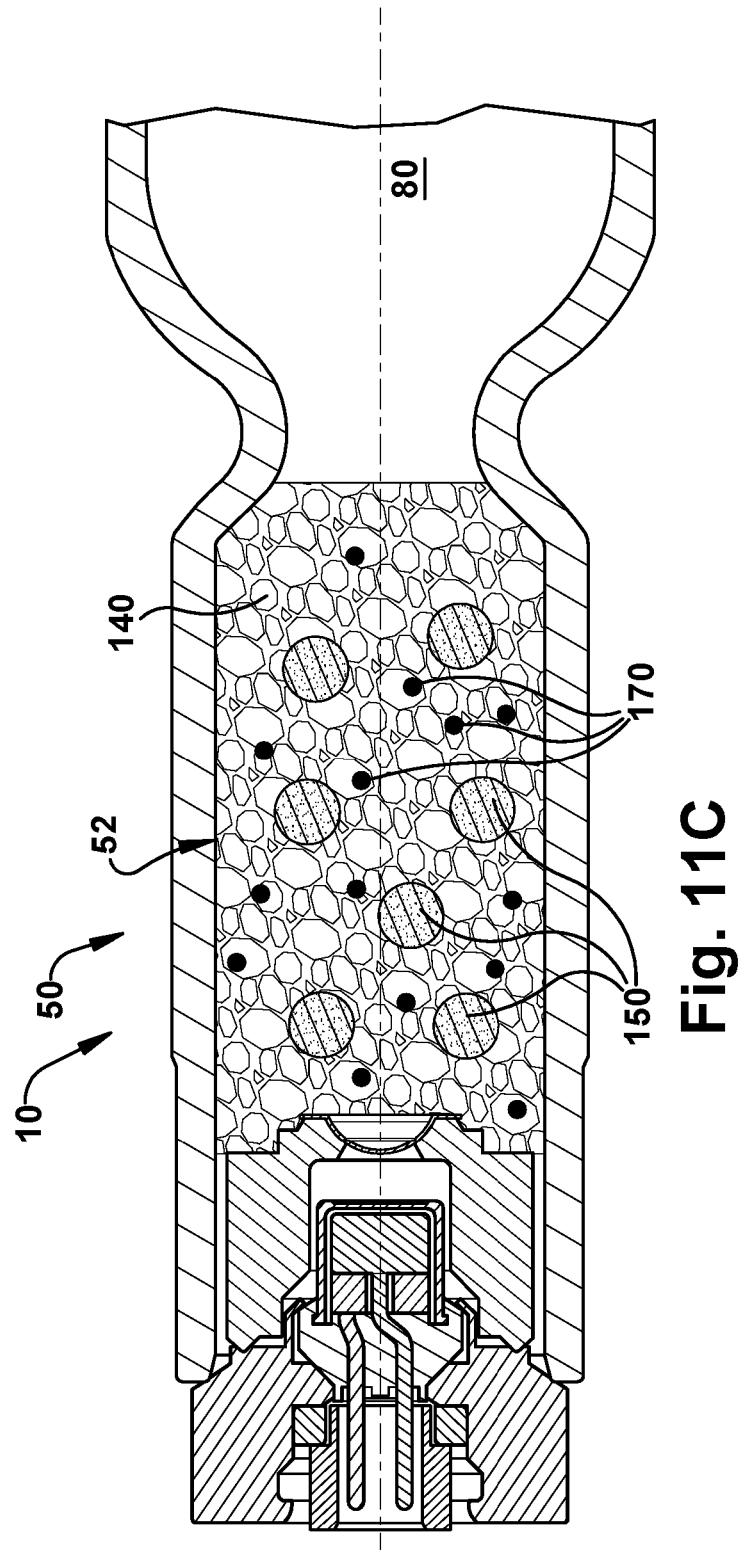

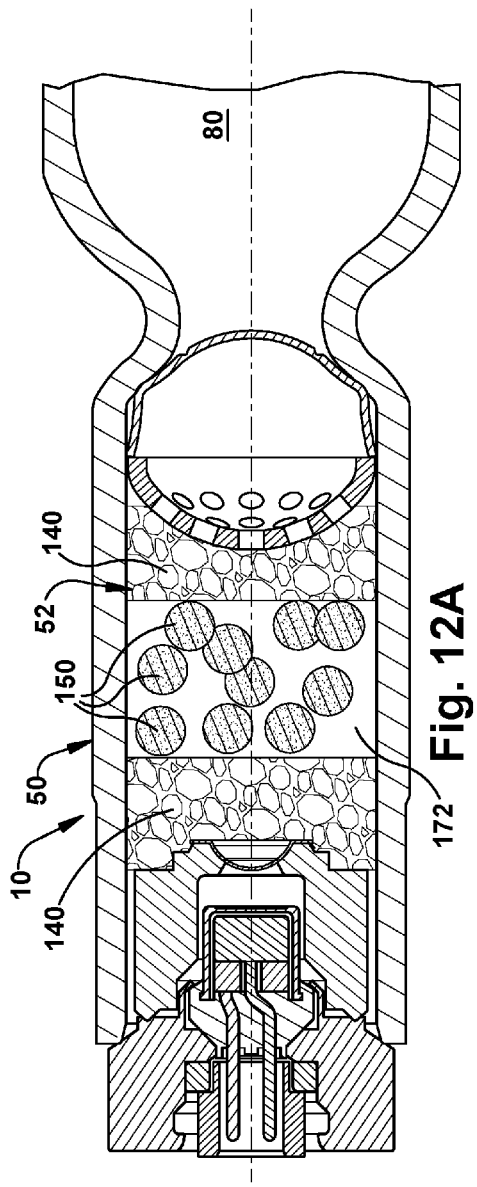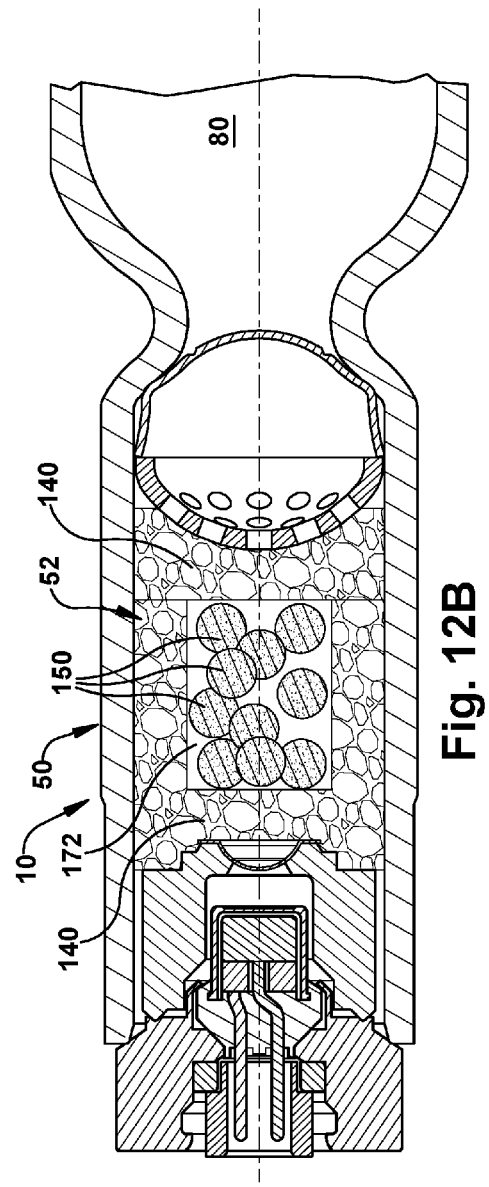

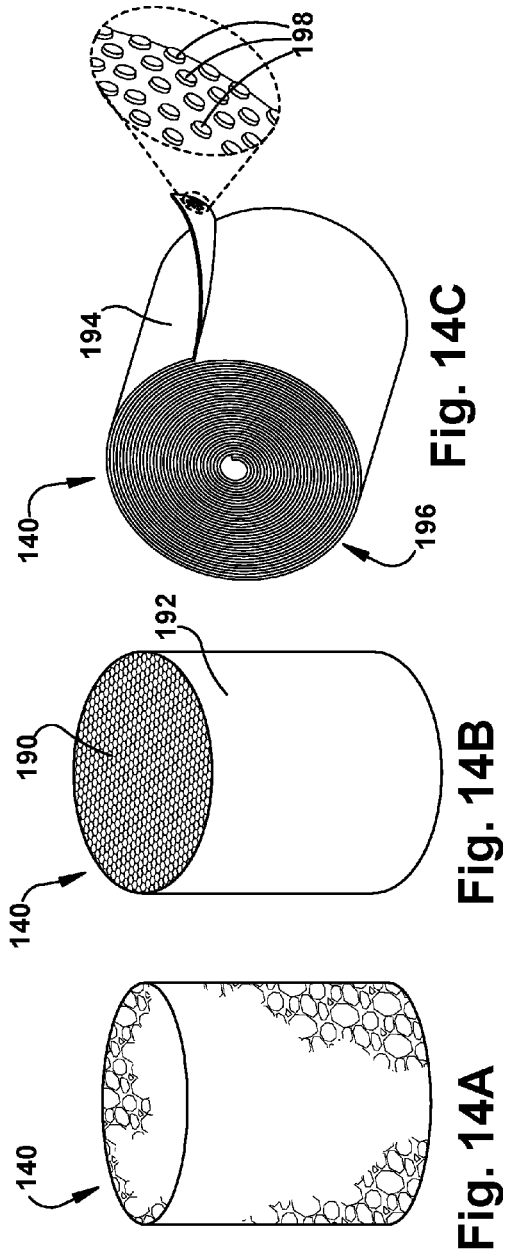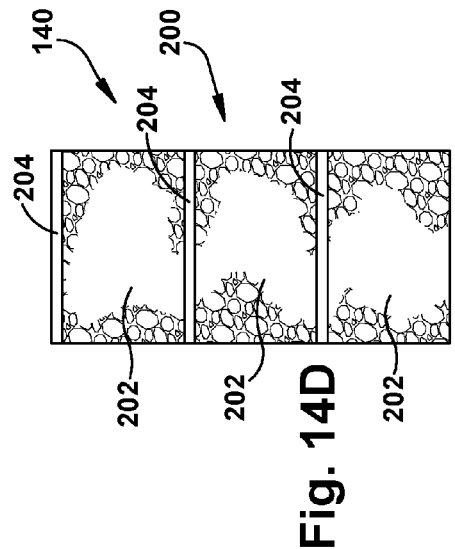

HYBRID INFLATOR WITH FOAM AS A FUEL

TECHNICAL FIELD

The invention relates to an inflator for providing inflation fluid for inflating an inflatable vehicle occupant protection device.

BACKGROUND OF THE INVENTION

It is known to provide an inflator for inflating an inflatable vehicle occupant protection device, such as an air bag. One particular type of inflator is a hybrid inflator, which incorporates and combines elements of both stored gas inflators and solid propellant gas generators.

Hybrid inflators can be generally elongated and tubular in form, including a reaction chamber that contains the solid propellant, and a pressure chamber that contains the stored gas. The reaction and pressure chambers can be separated by a rupturable membrane, such as a burst disk. An igniter assembly is supported at the end of the inflator adjacent the reaction chamber, and is typically isolated from the reaction chamber by a rupturable membrane, such as a burst disk. A diffuser assembly is supported at the end of the inflator adjacent the pressure chamber. The pressure chamber and the diffuser assembly are separated from one another by a rupturable membrane, such as a burst disk.

Upon actuation of the inflator, the pyrotechnic material of the igniter ignites and the burst disk is ruptured in response. Reaction products from the igniter enter the reaction chamber and ignite solid propellant, causing a reaction that produces reaction products (e.g., heat and inflation fluid). The burst disk separating the reaction chamber and the pressure chamber ruptures in response to the reaction of the solid propellant. The reaction products from the solid propellant enter the pressure chamber and mix with the stored gas. The added heat and inflation fluid increases both the amount of fluid and the fluid pressure in the pressure chamber. The burst disk separating the diffuser from the pressure chamber ruptures. The inflation fluid is directed out of the inflator through the diffuser and into the protection device.

SUMMARY OF THE INVENTION

According to one aspect, the invention relates to an inflator that is actuatable to provide inflation fluid for inflating an inflatable vehicle occupant protection device. The inflator includes a volume of stored gas and a propellant that is ignitable to undergo a reaction that produces reaction products. The reaction products include heat and gas that mix with the stored gas to produce a mixture of inflation fluid. The inflator is configured to discharge the inflation fluid to inflate the protection device. The propellant includes an open cell foam fuel propellant. The reaction includes a combustion reaction in which the foam fuel propellant reacts with a gas oxidizer including oxygen to produce heat and gas reaction products that mix with the stored gas.

According to another aspect, alone or in combination with any preceding aspect, the propellant can also include a pyrotechnic propellant including a chemical composition. The reaction can include a self-sustaining chemical reaction in which a fuel component of the chemical composition reacts with an oxidizer component of the chemical composition to produce heat and gas reaction products that mix with the stored gas.

According to another aspect, alone or in combination with any preceding aspect, the foam fuel propellant can include a foam polyhydrocarbon, carbonhydrates or polyolefin material.

According to another aspect, alone or in combination with any preceding aspect, the foam fuel propellant can include at least one of a polyether, polyester, polystyrene, polypropylene, polyethylene, and polyurethane material.

According to another aspect, alone or in combination with any preceding aspect, the propellant can include reaction modifiers including at least one of aluminum, titanium, silicon, magnesium, aluminum metal oxides, titanium metal oxides, silicon metal oxides, magnesium metal oxides, aluminum alloys, titanium alloys, silicon alloys, magnesium alloys, an magnesium-aluminum alloy, all in at least one of granular, flaked, and powdered form, boron hydrides, and soot.

According to another aspect, alone or in combination with any preceding aspect, the inflator can include a housing defining a reaction chamber for containing the propellant and the gas oxidizer, and a pressure chamber for containing the stored gas. The reaction chamber and the pressure chamber can be separated by a first closure member that is rupturable in response to actuation of the inflator to permit the reaction products produced by the propellant to mix with the stored gas in the pressure chamber.

According to another aspect, alone or in combination with any preceding aspect, the inflator can include an igniter that is actuatable to ignite the propellant in the reaction chamber. The igniter can be configured to produce a shock wave when actuated, and wherein the foam fuel propellant in the reaction chamber is configured to permit the shock wave to propagate through the reaction chamber without a significant loss of intensity. The shock wave can act on and rupture the first closure member separating the reaction chamber from the pressure chamber, thereby allowing the reaction products to enter the pressure chamber and mix with the stored gas.

According to another aspect, alone or in combination with any preceding aspect, the inflator can include an inflator outlet portion positioned at an end of the pressure chamber opposite the first closure member, and a second closure member that closes the inflator outlet. The shock wave produced by actuation of the igniter can be configured to also propagate through the pressure chamber and rupture the second closure member after rupturing the first closure member.

According to another aspect, alone or in combination with any preceding aspect, the inflator can include an inflator outlet portion positioned at an end of the pressure chamber opposite the first closure member, and a second closure member that closes the inflator outlet. The first closure member can be configured to produce a shock wave in response to being ruptured. The shock wave produced by rupture of the first closure member can propagate through the pressure chamber and rupture the second closure member.

According to another aspect, alone or in combination with any preceding aspect, the first closure member can provide a gas permeable seal between the reaction chamber and the pressure chamber.

According to another aspect, alone or in combination with any preceding aspect, the propellant can include foam fuel propellant only.

According to another aspect, alone or in combination with any preceding aspect, the foam fuel propellant can be compressed in a reaction chamber of the inflator and conforms to the inflator structures in the reaction chamber.

According to another aspect, alone or in combination with any preceding aspect, the foam fuel propellant can be configured so as not to fill the entire reaction chamber. The foam fuel propellant can be held in place in the reaction chamber by at least one of adhesives and a frictional engagement resulting from the foam being compressed within the reaction chamber.

According to another aspect, alone or in combination with any preceding aspect, the volume of the foam fuel propellant can be selected to tailor the output of the inflator without adjusting the structure of the inflator to accommodate the selected volume.

According to another aspect, alone or in combination with any preceding aspect, the foam fuel propellant can fill an entire reaction chamber of the inflator.

According to another aspect, alone or in combination with any preceding aspect, the foam fuel propellant can include one or more bores that extend through the foam fuel propellant.

According to another aspect, alone or in combination with any preceding aspect, the foam fuel propellant can include a single mass of foam fuel propellant material.

According to another aspect, alone or in combination with any preceding aspect, the foam fuel propellant can include a plurality of foam fuel propellant bodies. Different ones of the foam fuel propellant bodies can be made of different types of foam fuel propellant material.

According to another aspect, alone or in combination with any preceding aspect, the foam fuel propellant bodies can have at least one of shapes and colors that correspond to the type of foam fuel propellant material from which the bodies are constructed.

According to another aspect, alone or in combination with any preceding aspect, the stored gas, the propellant, and the oxidizing gas can all be stored in a single chamber in the inflator. The stored gas and the oxidizing gas can include a gas mixture including oxygen and at least one inert gas.

According to another aspect, alone or in combination with any preceding aspect, the pyrotechnic propellant can include a plurality of pyrotechnic propellant rings arranged axially in a stacked configuration in the inflator.

According to another aspect, alone or in combination with any preceding aspect, the pyrotechnic propellant rings can include aligned central openings. the foam fuel propellant can include a cylindrical portion that extends through the aligned central openings.

According to another aspect, alone or in combination with any preceding aspect, the pyrotechnic propellant rings can be spaced from each other axially in the inflator. The foam fuel propellant can include disc shaped spacers positioned between the pyrotechnic propellant rings.

According to another aspect, alone or in combination with any preceding aspect, the pyrotechnic propellant rings can be spaced from each other axially in the inflator and comprise aligned central openings. The foam fuel propellant can include disc shaped spacers positioned between the pyrotechnic propellant rings and cylindrical portions that extend through the aligned central openings.

According to another aspect, alone or in combination with any preceding aspect, the foam fuel propellant can include one or more bores that extend through the foam fuel propellant. The pyrotechnic propellant can include a plurality of pyrotechnic propellant tablets that are supported in the bores through an interference fit in which the tablets deform the foam fuel propellant walls defining the bores.

According to another aspect, alone or in combination with any preceding aspect, the foam fuel propellant can include a plurality of foam fuel propellant bodies and the pyrotechnic propellant comprises a plurality of pyrotechnic propellant bodies. The foam fuel propellant bodies and the pyrotechnic propellant bodies can be placed in a mixture in the inflator.

According to another aspect, alone or in combination with any preceding aspect, the foam fuel propellant can include a body of foam fuel propellant and the pyrotechnic propellant can include a plurality of pyrotechnic propellant bodies embedded in the foam fuel propellant.

According to another aspect, alone or in combination with any preceding aspect, the foam fuel propellant can define a space within the inflator for containing the pyrotechnic propellant. The pyrotechnic propellant can include a plurality of pyrotechnic propellant tablets that are supported in the space. The pyrotechnic propellant tablets can fill the space. The foam fuel propellant can define all sides of the space and thereby surround the pyrotechnic propellant tablets that are supported in the space.

According to another aspect, alone or in combination with any preceding aspect, the foam fuel propellant can be formed as an extrusion in which the foamed polymer forms a uniform structure in the form of a matrix or honeycomb structure that define a plurality of small extruded channels that extend along its length.

According to another aspect, alone or in combination with any preceding aspect, the foam fuel propellant can be formed as a sheet of open cell foam polymer material that is rolled-up to form a foamed polymer roll. The foam polymer sheet can included a series of projections extending from one or both surfaces of the sheet that serve to space the overlying layers of the sheet in order to create space between the layers in which gas can collect.

According to another aspect, alone or in combination with any preceding aspect, the foam fuel propellant can be formed as a stack in which separate masses of foamed polymer propellant are stacked alternately with layers of foil that affect the burn rate of the foam fuel propellant.

According to another aspect, alone or in combination with any preceding aspect, the foam fuel propellant can be formed as a stack of separate masses of foamed polymer propellant. The masses can have different mechanical or chemical properties that affect the burn rate of the foam fuel propellant.

DRAWINGS

The foregoing and other features of the invention will become apparent to those skilled in the art to which the invention relates upon reading the following description with reference to the accompanying drawings, in which:

FIG. 1 is a schematic sectional view illustrating an inflator, according to an example configuration of the invention.

FIGS. 2A-2C are schematic sectional views of a portion of an inflator that is similar to the inflator of FIG. 1, according to other example configurations of the invention.

FIGS. 3A-3B are schematic sectional views of a portion of an inflator that is similar to the inflator of FIG. 1, according to other example configurations of the invention.

FIGS. 5A-5C are schematic sectional views of a portion of an inflator that is similar to the inflator of FIG. 1, according to other example configurations of the invention.

FIG. 6 is a schematic sectional view of a portion of an inflator that is similar to the inflator of FIG. 1, according to another example configuration of the invention.

FIGS. 7A-7B are schematic sectional views of a portion of an inflator that is similar to the inflator of FIG. 1, according to other example configurations of the invention.

FIGS. 8A-8B are schematic sectional views of a portion of an inflator that is similar to the inflator of FIG. 1, according to other example configurations of the invention.

FIGS. 9A-9B are schematic sectional views of a portion of an inflator that is similar to the inflator of FIG. 1, according to other example configurations of the invention.

FIG. 10 is a schematic sectional view of a portion of an inflator that is similar to the inflator of FIG. 1, according to another example configuration of the invention.

FIGS. 11A-11C are schematic sectional views of a portion of an inflator that is similar to the inflator of FIG. 1, according to other example configurations of the invention.

FIGS. 12A-12B are schematic sectional views of a portion of an inflator that is similar to the inflator of FIG. 1, according to other example configurations of the invention.

FIGS. 14A-14D are schematic sectional views of a propellant component that can be implemented in an inflator, according to another example configuration of the invention.

DESCRIPTION

Figure 2C:
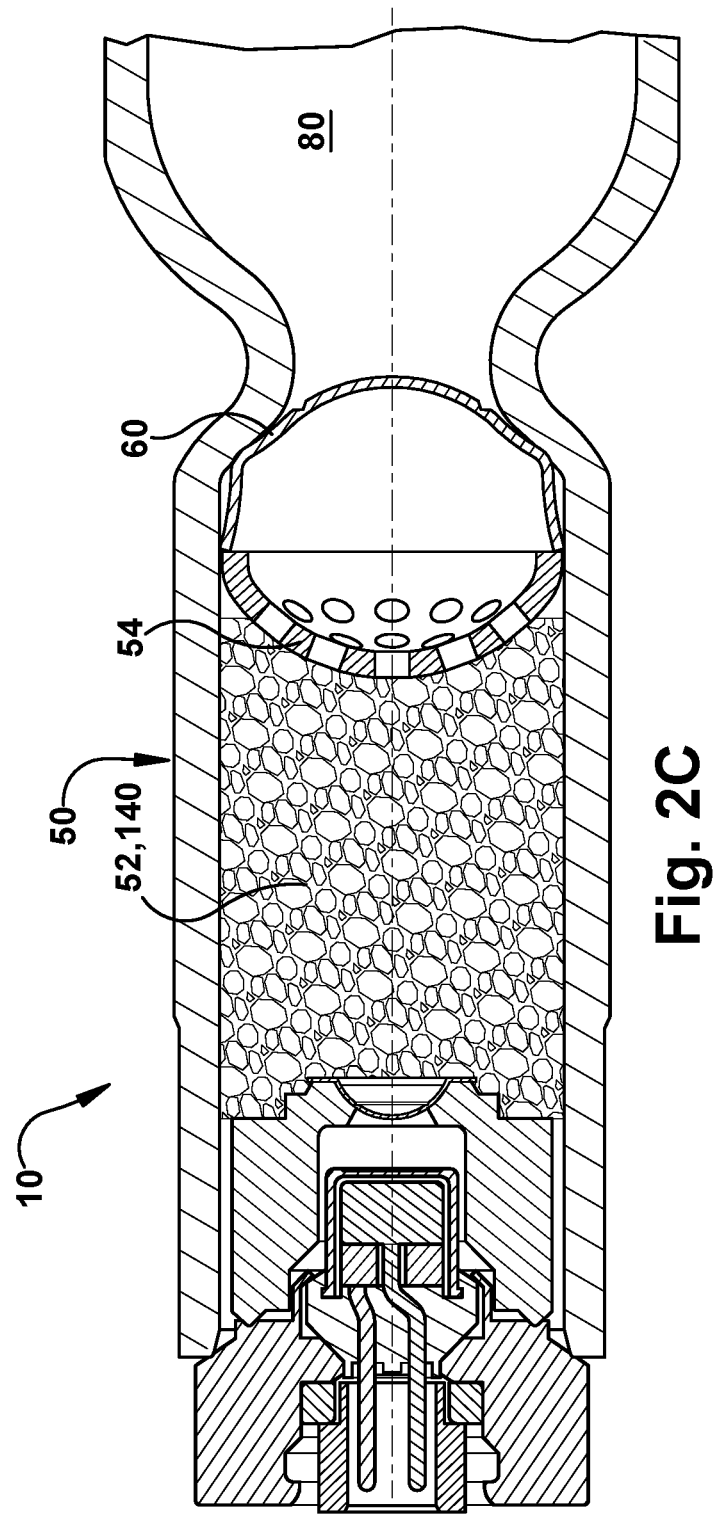

The invention relates to an apparatus for helping to protect an occupant of a vehicle. Representative of the invention, an apparatus 10 in the form of an inflator serves as an inflation fluid source that is actuatable to provide inflation fluid for inflating an inflatable vehicle occupant protection device (not shown). The inflator 10 can be particularly well-suited for inflating an inflatable vehicle occupant protection device in the form of an air bag, particularly an inflatable curtain. The inflator 10 can, however, be used or adapted to provide inflation fluid for inflating any inflatable vehicle occupant protection device that requires inflation, such as an inflatable driver air bag, an inflatable passenger air bag, an inflatable side air bag, an inflatable seat belt, an inflatable knee bolster, an inflatable headliner, a rear seat air bag, a knee bolster operated by an inflatable air bag, a pedestrian air bag, or any other vehicle occupant protection device that requires inflation fluid for operation, like an actuator apparatus which is used to lift or move a part of a vehicle, for example a hood of a car, by for instance moving a piston out of a cylinder, in order to protect a person being outside of the car, like a pedestrian.

Inflator Construction

The inflator 10 is a hybrid inflator that includes a gas-generating material, referred to herein generally as a "propellant," that is ignitable to cause a reaction that generates heat and inflation fluid. The inflator also includes stored inflation fluid in the form of a pressurized gas that is released upon actuation of the inflator. Upon actuation of the inflator 10, the inflation fluid and heat generated by the propellant is combined with the stored gas, and this mixture is discharged from the inflator. This mixing helps maintain a desired pressure within the inflator so that the inflation fluid can be delivered to the protection device rapidly and at the desired volumetric flow rate.

To produce heat and inflation fluid, the propellant undergoes a reaction in response to ignition, and this reaction produces reaction products, such as inflation fluid and heat, that are used to inflate an air bag. The type of reaction and the reaction products that it produces are dictated by the particular type of propellant. For example, a combustion reaction is a chemical reaction in which a propellant in the form of a fuel reacts with an oxidizer which, typically, is oxygen gas. The oxygen can come from atmospheric air or other sources, such as pure oxygen or a gas mixture including pure oxygen. Thus, in one configuration, an inflator can include a propellant in the form of a fuel and an oxidizer in the form of oxygen gas or a gas mixture including oxygen. In this configuration, upon ignition, a combustion reaction takes place in which the propellant fuel reacts with the oxygen to produce inflation fluid and heat.

As another example, a pyrotechnic reaction is a chemical reaction involving a propellant in the form of a pyrotechnic material. A pyrotechnic material is typically a chemical composition that includes both a fuel and an oxidizer, and therefore does not rely on an external oxidation source, such as air or oxygen gas. When ignited, the pyrotechnic material produces a self-sustained reaction of the fuel with the oxidizer. Thus, in another configuration, an inflator can include a propellant in the form of a pyrotechnic material, which is self sustaining and does not require an oxidizing gas.

An example configuration of an inflator 10 according to the invention is illustrated in FIG. 1. Referring to FIG. 1, the inflator 10 includes a housing 12 in the form of an elongated tube that is crimped or otherwise machined or formed at various locations along its length to define sections or portions of the inflator and also to define structures or surfaces for supporting other elements of the inflator. Viewed from left to right in FIG. 1, spaced along its axis 14, the inflator 10 includes an igniter support portion 20, a portion defining a reaction chamber 50, a portion defining a pressure chamber 80, and an outlet portion 100. A plurality of inflator components, described below, are positioned on and/or within the various portions of the inflator 10 and are aligned axially along its length.

The igniter support portion 20 is configured to support an igniter assembly 22. The igniter assembly 22 includes an igniter 24 that is supported in an igniter holder 26. Igniters and igniter holders are well known devices and, therefore, the igniter assembly 22 illustrated herein is by way of example only. The igniter assembly 24 can have any desired configuration suited to perform as described herein. In the example configuration of FIG. 1, the igniter 24 can be secured to the igniter holder 26 by crimping the holder onto the igniter.

The igniter assembly 22 is secured to the igniter support portion 20 of the housing 12 by known methods, such as welding. To effectuate this connection, the igniter holder 26 has a generally cylindrical configuration adapted to engage and fit with the igniter support portion 20 at the terminal end of the housing 12. In the example configuration illustrated in FIG. 1, the weld is formed at the interface between a tapered shoulder of the igniter holder 26 and the terminal end of the housing 12. Any known welding process (e.g., MIG, TIG, butt welding, and friction welding) can be used to form this welded connection. Alternative connections, such as crimping or mechanical fastening (e.g., a threaded connection), can also be used to facilitate this connection. The connection of the igniter holder 26 to the housing 12 forms a gas-tight hermetic seal at the igniter end of the inflator 10.

The igniter 24 includes a body of pyrotechnic material 28, referred to herein as a "squib," that is ignitable to initiate a reaction in the reaction chamber 50. Actuation of the igniter 24, and ignition of the squib 28, is effectuated electrically via an electrical signal delivered via igniter leads 30. The leads 30 can be supported in a connector 32 that mates with a connector (not shown) connected to vehicle wiring and to sensors that are adapted to trigger actuation of the inflator 10.

Adjacent to the igniter assembly 22, the inflator 10 includes a burst disk support 34 that supports a burst disk 36. The burst disk support 34 is generally cylindrical in form and forms a close fit with the inside diameter of the igniter support portion 20 of the housing 12. The burst disk support 34 abuts the igniter holder 26 and includes a through bore 38 into which the igniter 24 is received. The through bore 38 extends axially through the burst disk support 34 and has varying diameters along its length. The through bore 38 terminates extending through an annular shoulder 40 upon which the burst disk 36 is connected and supported.

The burst disk 36 has a domed configuration and is oriented with its convex surface presented toward the igniter 24 in the through bore 38. The concave surface of the burst disk 36 is presented facing into the reaction chamber 50. The annular shoulder 40 supports an annular portion of the burst disk 36, but leaves a central portion of the disk exposed in close proximity to the squib 28 of the igniter 24. The burst disk 36 helps provide an effective seal between the igniter assembly 22 and the igniter support portion 20.

The reaction chamber 50 supports a mass of gas generating material 52, referred to herein as a propellant. In the example configuration of FIG. 1, the burst disk 36 and the burst disk support 34 together define one end (the left end as viewed in FIG. 1) of the reaction chamber 50. The opposite end of the reaction chamber 50 is defined by a sieve 54 for collecting combustion particles, such as slag, that may be generated as a byproduct of combustion of the propellant 52 and/or to keep propellant 52 during combustion inside the reaction chamber. The sieve 54 has a domed configuration and spans the diameter of the reaction chamber 50, with its convex surface presented toward the propellant 52. A plurality of apertures extend through the sieve 54, sized to permit the flow of gas through the sieve, while blocking or otherwise limiting the passage of particles/slag through the sieve.

The inflator housing 12 has a reduced diameter in the area of the interface or transition from the reaction chamber 50 to the pressure chamber 80. This reduced section of the housing 12 forms an annular shoulder 56 that receives a reaction chamber sleeve 60, which forms a seal, especially a gas permeable seal, between the reaction chamber 50 and the pressure chamber 80.

The reaction chamber sleeve 60 has a generally cup-shaped configuration, including an annular wall portion 62 and a domed end portion 64 that spans across the annular wall. The reaction chamber sleeve 60 is press-fitted into the reaction chamber 50 so that the annular wall portion 62 engages the inner diameter of the reaction chamber 50 and so that the domed end portion 64 engages and mates with the annular shoulder 56 of the inflator housing 12.

The domed end portion 64 serves as a rupturable closure, or burst disk, between the reaction chamber 50 and pressure chamber 80 in the manner of a burst disk. This burst disk 64 is configured so that the convex surface of the disk is presented facing toward the pressure chamber 80. The domed burst disk 64 extends at least partially into or through the annular shoulder 56 and closes one end of the pressure chamber 80. The burst disk 64, having its domed structure presented to the pressure inside the pressure chamber 80 in this manner, is suited to maintain the closure of the pressure chamber 80 in a non gastight manner. This means the reaction chamber sleeve 60, including the burst disk 64, is designed to close one end of the pressure chamber 80 in a non hermetical way. For example there can be axial channels (not shown in drawings) along the annular wall portion 62 of the burst disk 64 allowing pressure compensation between the pressure chamber 80 and the reaction chamber 50 in a non activated state of the inflator 10. As another example, owing to the fact that the seal afforded by the press-fitting of the reaction chamber sleeve 60, pressure compensation between the pressure chamber 80 and reaction chamber 50 can take place through the abutting portions of the reaction chamber sleeve 60 (e.g., the burst disk 64) and the housing 12. Therefore the burst disk 64 constitutes a gas permeable separation means between the pressure chamber 80 and the reaction chamber 50.

As shown in FIG. 1, an annular end portion of the sieve 54 abuts the annular wall portion 62 of the reaction chamber sleeve 60. The reaction chamber sleeve 60 thus can help position and support the sieve 54 in the reaction chamber 50. The sieve 54 and reaction chamber sleeve 60 can be separate parts assembled together in the reaction chamber 50. Alternatively, the sieve 54 and reaction chamber sleeve 60 can be press-fitted together and installed in the reaction chamber as a unit. As another alternative, the sieve 54 and reaction chamber sleeve 60 can have a unitary, e.g., welded, construction and can be installed as a unitary component.

The pressure chamber 80, being configured to contain a stored gas or gases under pressure, does not include any internal structures. The outlet portion 100 is positioned at the end of the pressure chamber 80 opposite the reaction chamber sleeve 60 and forms the terminal end of the inflator housing 12. The outlet portion 100 includes an annular recess 102 on an exterior of the housing 12 for receiving and supporting a diffuser 104. The diffuser 104 is welded onto the recess 102 and covers the outlet portion 100, including an open end 106 of the housing 12 through which inflation fluid is discharged.

The open end 106 of the housing 12 has a reduced diameter and receives a closure member 108, which is connected to the open end via known methods, such as welding. Any known welding process (e.g., MIG, TIG, butt welding, and friction welding) can be used to form this welded connection. The closure member 108 includes a through bore 110 that is closed by a rupturable closure member in the form of a burst disk 112. In the example configuration of FIG. 1, the domed configuration of the closure burst disk 112 is arranged such that the convex surface faces outward through the through bore 110 in the closure member 108.

From the above, it will be appreciated that pressurization of the gas or gases stored in the pressure chamber 80 is maintained by the seals afforded at one end of the inflator 10 by the connection of the igniter assembly 22 to the housing 12, and at the opposite end of the inflator by the connection of the closure member 108 to the housing. The reaction chamber sleeve 60 generally, and the burst disk 64 specifically, does not prohibit pressure within the inflator 10 from normalizing or equalizing between the reaction chamber 50 and pressure chamber 80. Rather, the reaction chamber sleeve 60 helps improve the performance of the inflator 10, as described herein.

The inflation fluid stored in the pressure chamber 80 can be any gas or combination of gases typically used in stored gas or hybrid inflators. For example, the inflation fluid stored in the pressure chamber 80 can include helium, a mixture of helium and argon, or a mixture of helium, argon, and oxygen. The composition of gasses in the pressure chamber 80 can be maintained at a desired ratio so as to fall within a desired molecular weight range. For example, in a composition including helium, argon, and oxygen, a molecular weight of the gas can be maintained at between 7 and 39 g/mol. In this range, the lower limit of 7 g/mol can, for example, be maintained in a composition of 90% helium and 10% oxygen.

Upon sensing the occurrence of an event for which inflation of the protection device (e.g., air bag) associated with the inflator 10 is desired, a sensor (not shown) provides an actuation signal to the igniter 24 via lead wires connected to the pins 30. Upon receiving this actuation signal, the squib 28 fires, which ruptures the burst disk 36 and ignites the propellant 52, causing the propellant to undergo a combustion reaction. The burst disk 64 also ruptures and the combustion products (i.e., heat and inflation fluid) generated by the propellant reaction enter the pressure chamber 80 and mix with the gas or gases stored therein. The propellant-generated heat and inflation fluid enter the pressure chamber 80, increasing the pressure of the gas mixture in the pressure chamber, and adding heat to the gas mixture.

The burst disk 112 ruptures and the inflation fluid is discharged from the inflator 12 through the diffuser 104 toward the protection device, either directly or through a conduit (not shown), such as a fill tube. The protection device inflates and deploys from a stored condition to an inflated and deployed condition in which the protection device can help protect the vehicle occupant(s).

Propellant Composition

According to the invention, the propellant 52 stored in the reaction chamber 50 includes a foam fuel propellant, the ignition of which results in a combustion reaction that produces inflation fluid and heat. In the example configuration of FIG. 1, the propellant 52 is illustrated as a unitary mass that is formed to fill the reaction chamber 50, i.e., the space bounded circumferentially by the housing 12, at one end by the burst disk 36 and burst disk support 34, and at the opposite end by the sieve 54. The propellant 52 can have any other shape/size configuration and can occupy any amount of space in the reaction chamber 50. The propellant 52 can be configured so that any foam fuel propellant component thereof can be uncompressed in the reaction chamber 50 or can be configured so that the foam is compressed by the adjacent inflator components, e.g., the burst disk 36, burst disk support 34, housing 12, and sieve 54.

The propellant 52 in the reaction chamber 50 can include propellants other than foam fuel propellants. For example, in addition to the foam fuel propellant, the propellant 50 can include a pyrotechnic propellant, a reaction modifier, or a combination of pyrotechnic propellant(s) and reaction modifier(s). The presence of these materials dictates the reaction(s) that take place in the reaction chamber 50 in order to tailor the gas generating characteristics of the inflator 10. The gas generating characteristics of the inflator 10 that can be tailored through the selection and configuration of the foam fuel propellant, any pyrotechnic propellants, and any reaction modifiers include the burn rate of the propellant and the type, volumetric flow rate, and temperature of the gas or gases generated by the inflator 10.

The foam fuel propellant component of the propellant 52 can have various chemical compositions. Generally speaking, the foam fuel propellant can be an open cell, combustible foam polyhydrocarbon or polyolefin material, such as polyether, polyester, polystyrene, polypropylene, polyethylene, and polyurethane. The foam fuel propellant can have various alternative physical characteristics and mechanical properties, including different open cell sizes, different porosity, different densities, different compressibility and different hardness. The foam fuel propellant could also have different optical properties, e.g., colors, that can be used to identify the type of foam fuel propellant in scenarios where foams of various different types or properties are used.

The density of the foam fuel propellant can, for example, be within the range of 10-90 kg/m$^3$. The density or hardness of the foam fuel propellant can, for example, be within the range of 2-10 kPa, where hardness is compression hardness determined by the pressure load required to cause a predetermined degree of compression or deflection of the foam fuel propellant. For example, the foam fuel propellant can have a density of 45 kg/m$^3$ and compression load deflection of 4.5 kPa at 40% deformation. Along with the type or chemical composition of the foam material, the size of the foam cells can also help determine the mechanical properties of the foam fuel propellant. Larger cells can reduce the density/hardness and increase the porosity of the foam. Smaller cells can increase the density/hardness and decrease the porosity of the foam. Typical cell sizes can, for example, be in the range of about 0.5-3 mm.

Pyrotechnic propellants components of the propellant 52 that can be included in the reaction chamber 50 along with the foam fuel propellant include any solid pyrotechnic propellant that is implemented in conventional pyrotechnic inflators, such as nitroguanidine, nitrocellulose, and guanidine nitrate pyrotechnic propellants. These solid pyrotechnic propellants can be included in various shapes and sizes, such as pellets, tablets, and rings.

The reaction modifiers can include combustible additives that act as catalysts that help modify the reaction characteristics of the foam fuel propellant(s) and any pyrotechnic propellant(s) included in the inflator 10. These reaction characteristics can, for example, include burn rate, temperature, gases generated, gas volume, etc. For example, metals, such as aluminum, titanium, silicon, magnesium, and metal oxides thereof, and alloys, such as a magnesium-aluminum alloy, can be included in the foam fuel propellant. These metal reaction modifiers can be added, for example, in granular, flaked, or powdered form. Other reaction modifiers, such as boron hydrides and soot can also be included.

The combustion reaction of the foam fuel propellant requires an oxidizer. In the example configuration of FIG. 1, besides containing the propellant 52, the reaction chamber 50 includes a pressurized oxidizing gas. The oxidizing gas can be oxygen alone or can be a combination of gasses including oxygen at a predetermined percentage. The percentage of oxygen in the oxidizing gas can therefore be up to 100%.

Advantageously, this pressurized oxidizing gas can penetrate the foam and fill the open cells and any area surrounding the cells of the foam fuel propellant. When the foam fuel propellant is consumed in the combustion reaction, there is a flame front that travels through the propellant. Because the oxidizing gas penetrates through the open cells of the foam fuel propellant, there is always oxidizing gas available to be consumed by the combustion reaction. This helps to ensure that the combustion reaction of the foam fuel propellant with oxidizing gas takes place in a consistent and uniform manner with a high degree of repeatability and reliability. The presence of the oxidizing gas in the reaction chamber 50 will not negatively affect any pyrotechnic component of the propellant 52. In fact, the oxidizer gas may improve the reaction of certain pyrotechnic propellants.

The physical characteristics and mechanical properties of the foam fuel propellant can affect the rate and efficiency of the combustion reaction that is produced when the propellant 52 is ignited. These physical characteristics include the density, porosity, compressibility, and hardness of the foam fuel propellant. For example, the porosity of the foam fuel propellant helps determine how readily oxidizing gas penetrates or fills the open cells within the foam. Additionally, generally speaking, as porosity increases, the foam surface area within the volume of foam fuel propellant can be increased and the wall thickness of the foam cells can be decreased. Adjusting the density of the foam fuel propellant helps determine the amount of fuel per unit volume of the propellant. The compressibility of the foam fuel propellant helps determine how much propellant can be "squeezed" into the available space, i.e., the reaction chamber 50, which also adjusts the effective density of the foam fuel propellant.

From this, it can be appreciated that the burn rate of a foam fuel propellant can be controlled by adjusting the porosity of the foam. This could be achieved by selecting an appropriate porosity for the entire foam fuel propellant mass. Alternatively, this could be achieved by stacking foam pieces, such as disks, of varying porosity adjacent to each other along the length of the reaction chamber 50.

Adjusting or balancing these factors—the chemical composition and physical characteristics of the foam fuel propellant, and the type and composition of the oxidizing gas—contributes to determining the efficiency and rate of the combustion reaction that takes place in the reaction chamber 50. Through careful selection and balancing of these factors, the inflator 10 can be configured such that the combustion reaction of the foam fuel propellant produces a predetermined volume of inflation that is delivered in a predetermined amount of time and at a predetermined temperature. In this manner, the inflator 10 can be sized to possess inflation fluid delivery characteristics commensurate with the specific inflatable protection device with which it is paired with repeatability and reliability.

In addition to adjusting the characteristics of the foam fuel propellant, the amount of pyrotechnic propellant included in the propellant 52 can also be adjusted. Given a specific chamber size in which to contain the foam fuel propellant, the pyrotechnic propellant, and the oxidizing gas, there are certain amounts or ratios that should be maintained. For instance, as the amount of foam fuel propellant increases, the room for pyrotechnic material decreases. The room for oxidizing gas also decreases, but it is compressible and therefore can be somewhat accommodating. Keeping in mind, however, that the gasses are stored in the pressure chamber 80 at extremely high pressures, such as from 5000 psi to over 10000 psi, the pressure of the oxidizing gas in the reaction chamber 50 will have correspondingly the same value of gas pressure like it is in the pressure chamber 80 due to the burst disk 64 constituting a gas permeable separation means between the pressure chamber 80 and the reaction chamber 50 in order to balance the pressure on opposite sides of the burst disk 64 in the non activated state of the inflator 10.

For example, where the foam fuel propellant is used as a booster for a pyrotechnic propellant, the weight percentage of foam fuel propellant should be about 0.25%-15.0%. Where the pyrotechnic propellant is used to improve the performance of the foam fuel propellant, the weight percentage of foam fuel propellant should be about 10%-100%, where 100% indicates an all foam implementation without any pyrotechnic propellants added. The foam fuel propellant load should be less than 70% of the volume of the reaction chamber 50, although this is not a strict requirement.

The amount of oxidizing gas in the reaction chamber should excess oxygen, that is, oxygen in the range of about 110% to 150% of the amount of oxygen required to support a stoichiometric reaction. While excess oxygen in the reaction chamber should generally be the case, adjusting the amount of excess oxygen in the reaction chamber can be done in order to tailor the combustion reaction that takes place therein. For example, less than 10% excess oxygen is not wise because inflator output calculations are typically based on complete consumption of the foam fuel propellant and a 10% excess is considered to be a minimum amount to ensure complete stoichiometric reaction. Excess oxygen in the amount of about 30% can be a standard amount providing plenty of excess oxygen to ensure a complete reaction. Increasing the excess oxygen to about 40% or more can be used to increase the inflator output to meet more aggressive output requirements. For example, one particular oxidizer gas composition could be 80% helium and 20% oxygen with the amount of oxygen being 130% that required for a stoichiometric reaction with the foam fuel propellant.

From the above, it will be appreciated that an inflator having a particular configuration, such as that shown in FIG. 1, can be made to have various inflation fluid output characteristics simply by changing the chemical composition and/or physical characteristics of the propellant 52 and its components without changing the overall dimensions of the space in the reaction chamber 50 for accommodating the propellant. Thus, a single inflator configuration can be utilized in different implementations where varying inflator output characteristics are required. To avoid confusion in the manufacture of inflators utilizing foam fuel propellants to produce different outputs, the foam fuel propellants can be augmented by adding pigments to color-code the foam according to its output characteristics.

Also, the products of the reaction(s) that take place in the reaction chamber 50 vary due to the composition of the propellant 52. For example, the byproducts foam fuel propellants made of polyhydrocarbons, polyether, polyester, or polyurethane are primarily carbon dioxide and water. Pyrotechnic propellants, however, in addition to different gases, also might generate particulates or slag, which might necessitate the inclusion of the sieve 54 for the purpose of collecting these byproducts.

Shock Wave and Overpressure Burst Disk Rupture

In operation, there are essentially two manners by which the burst disk 112 can be opened so that the inflation fluid can be discharged from the inflator 10 into the associated air bag. In one manner, a shock wave can be generated and can propagate along the length of the inflator 10 to strike and rupture the burst disk 112. In the other manner, the burst disk 112 can rupture in response to combustion of the propellant 52 producing heat and gases that create an overpressure in the pressure chamber 80. Because the rapid delivery of inflation fluid can be important to a vehicle occupant safety system, configuring the inflator 10 to rupture the burst disk 112 with a shock wave can be desirable.

A shock wave is produced any time a wave propagates or moves with the local speed of sound in a fluid, preferably in form of a single pressure front with a high magnitude. In the example configurations of the inflator 10, a shock wave can be produced from the occurrence of either of both of two events. First, a shock wave can occur as the result of a combustion or blast event, such as the actuation of the igniter 24. This shock wave is indicated generally by the arrow labeled "A" in FIG. 1. Second, a shock wave can be produced as the result of an abrupt and sharp increase in pressure, such as that which occurs upon the rupture of a burst disk, such as the igniter burst disk 36 (indicated generally by the arrow labeled "B" in FIG. 1) or the burst disk 64 of the reaction chamber sleeve 60 (indicated generally by the arrow labeled "C" in FIG. 1).

The inflator 10 can be configured to produce any of these shock waves, alone or in any combination, in response to actuation. To cause a shock wave in response to actuation of the igniter 24, the igniter can be sized so that the combustion event resulting from actuation is powerful enough to produce the requisite wave speed through the fluid(s) in the various chambers of the inflator 10. To cause a shock wave in response to rupture of one or more of the burst disks 36, 64, the configuration and materials used to construct the disks can be selected so that the pressure required to cause the rupture event is strong enough to produce the requisite wave speed through the fluid(s) in the various chambers of the inflator 10.

The manner in which the burst disk 112 is opened (i.e., via shock wave or over pressure) can be selected depending on the implementation in which the inflator 10 is being utilized. For example, in an implementation where a comparatively slow inflation time is required, such as a passenger frontal air bag implementation, rupture of the burst disk 112 through over pressure in the pressure chamber 80 can be favourable. In an implementation where a comparatively fast inflation time is required, such as a side impact air bag or a curtain air bag implementation, rupture of the burst disk 112 through shock wave generation can be more advantageous.

In view of the above, those skilled in the art will appreciate that the inflator 10 can be configured to provide a simple and economical configuration that can be utilized to provide a repeatable and reliable shock wave propagation through the pressure chamber 80 in order to rupture the outlet burst disk 112. One mechanism through which this shock wave generation can be realized is through the configuration and design of the reaction chamber sleeve 60 and the portion of the inflator housing 12, i.e., the annular shoulder 56, against which the sleeve is seated and to which it is secured.

For example, the burst disk 64 can, through its structural configuration and material selection, be designed to rupture at a pressure that is certain to generate a shock wave. This can be done, for instance, by selecting the thickness of the burst disk 64 and the depth of score lines along which the burst disk is configured to rupture. Additionally, the shoulder 56 can be configured to reduce the diameter of the burst disk 64, which would increase its strength and, therefore, the pressure at which it ruptures. Through these methods, the inflator 10 can be configured to generate shock waves in a consistent and reliable manner.

Advantageously, the presence in the propellant 52 of the foam fuel component, having an open cell construction and being filled with a gas or gases, does not inhibit the propagation of the shock waves. This is significant because, heretofore, inflator designs implementing shock wave burst disk rupture have required a clear path through fluid (gas) media in order to function. Recognizing that it is the oxidizing gas that occupies much of the volume in the reaction chamber 50, and that the foam fuel propellant a low-mass, thin-walled structure that is surrounded by the oxidizing gas, the foam will undergo compression and propagate the shock wave in a manner very similar to the gas and, therefore, will not produce any significant loss in shock wave intensity. Since the foam has an open cell configuration, the oxidizing gas permeates and is contiguous throughout the reaction chamber 50. As a result, propagation of the shock wave does not transfer from gas to cell wall and vice versa as much as it propagates through the contiguous volume of gas and the cell walls positioned therein.

The inflator 10 can have various alternative configurations that do not impact the operational characteristics of the inflator. Examples of configuration variations that can be implemented in the inflator 10 are illustrated in FIGS. 2A-15. In these figures, reference numbers identical to those used in FIG. 1 will be used to identify the corresponding components in FIGS. 2A-15. Thus, for example, the inflator in any of FIGS. 2A-15 is always identified as "inflator 10." Unique reference numbers will be used in FIGS. 2A-15 to identify any structures unique to those figures. In these example configurations, the primary differences are focused on the configuration and composition of the propellant 52. There are some structural differences in the inflators as well, but those differences are implemented primarily to accommodate the different propellants 52.

Foam Fuel Propellant as the Sole Gas Generating Source

FIGS. 2A-6 illustrate example configurations of the inflator 10 in which the propellant 52 includes a foam fuel propellant 140 as the only gas generating component stored in the reaction chamber 50. FIGS. 2A-2C illustrate example configurations of the inflator 10 in which the reaction chamber 50 is sized so as to permit the foam fuel propellant 140 to be configured, e.g., in size, shape, volume, etc., in order to tailor the output of the inflator according to desired performance specifications. As described below, these figures also illustrate certain component configurations and configuration options that can also be implemented.

Referring to FIG. 2A, the foam fuel propellant 140 is configured to leave an axial space 120 in the reaction chamber 50 between the propellant and the sieve 54. The purpose of the sieve 54 is to collect/capture slag and other reaction products from propellant components of the propellant 52, especially in case of pyrotechnic propellant. The propellant 52 in the example configuration of FIG. 2A, however, does not include any pyrotechnic components. Nevertheless the presence of the sieve 54 in FIG. 2A is to collect/capture slag and other reaction products from propellant components of the propellant 52 present in the example configuration of FIG. 2A, but as well as to illustrate that the inflator 10 can be configured to allow for adjusting or changing the composition of the propellant 52, even to add pyrotechnic components.

Additionally, the inflator 10 shown in FIG. 2A includes an optional spacer 122 positioned between the burst disk support 34 and the foam fuel propellant 140. The spacer 122 has a ring-shaped configuration and encircles the burst disk 36, creating an axial space 124 between the burst disk and the foam fuel propellant 140. In this configuration, the foam fuel propellant 140 can have a substantially cylindrical configuration and, due to the spacing, can be free or substantially free from axial compression.

The example configuration of FIG. 2A also demonstrates that the size and shape of the foam fuel propellant 140 can be tailored to provide desired gas generation characteristics in an inflator 10 where the remainder of the components are identical. In this example inflator configuration, the output of the inflator 10 can be increased by increasing the size/volume of the foam fuel propellant 140, e.g., by increasing its length. Similarly, the output of the inflator 10 can be decreased by decreasing the size/volume of the foam fuel propellant 140, e.g., by decreasing its length. The volume of the reaction chamber 50 allows for including a volume of oxidizing gas (e.g., oxygen) sufficient to support combustion of the propellant 52.

Additionally, in the example configuration of FIG. 2A, the reaction chamber sleeve 60 has a configuration that differs from that of the sleeve of FIG. 1. Specifically, the reaction chamber sleeve 60 includes a cylindrical, cup-shaped end portion 126 that replaces the domed end 64 of the sleeve in FIG. 1. The end portion 126 has a circular end surface including a rupturable portion that serves as a burst disk 128. Advantageously, the configuration of the end portion 126 can effectively increase the robustness of the shock wave generated by its rupture due, at least in part, to the increase in the volume of the reaction chamber 50 created by the end portion.

The example configuration of the inflator 10 of FIG. 2B is similar to the inflator configuration of FIG. 2A. Referring to FIG. 2B, the spacer is omitted, so the foam fuel propellant 140 abuts the burst disk support 34. As shown in FIG. 2B, the foam fuel propellant 140 can conform to the shape of the burst disk support 34, either by forming the propellant to match the contour of the burst disk support or by pressing the foam fuel propellant against the support so that it conforms due to deformation of the foam. For instance, in the example configuration of FIG. 2B, the foam fuel propellant 140 could be cylindrical in shape and pressed into the reaction chamber 50 so as to conform with the structures defining the chamber, such as the burst disk support 34.

The example configuration of the inflator 10 of FIG. 2B also omits the sieve and the shape of the reaction chamber sleeve 60 reverts back to the configuration of FIG. 1. Omitting the sieve can give render the inflator 10 to be of a foam fuel propellant specific configuration. Again, the physical configuration of the mass of foam fuel propellant 140, the size of the housing 12, and the shape of the reaction chamber sleeve 60 all contribute to the volume and, thus, the gas storage capacity of the reaction chamber 50. Additionally, as shown in FIG. 2B, the size (e.g., diameter) of the pressure chamber 80 can increased to provide a corresponding increase in stored gas capacity.

The example configuration of the inflator 10 of FIG. 2C is similar to the inflator configuration of FIG. 2B with the following modifications. The sieve 54 is included in the example configuration of FIG. 2C and the foam fuel propellant 140 is configured to fill the reaction chamber 50. The foam fuel propellant 140 abuts both the burst disk support 34 and the sieve 54. The foam fuel propellant 140 can be a cylindrical mass that is compressed between the sieve 54 and the burst disk support 34 or it can be configured so that its opposite end portions are contoured to match their respective abutting structures.

FIGS. 3A-3B illustrate example configurations of the inflator 10 in which the foam fuel propellant 140 is configured to include an axial bore 130. In the example configuration of FIG. 3A, the foam fuel propellant 140 has a comparatively large diameter axially extending central bore 130 configured such that an annular ring-shaped end portion 132 of the propellant 52 abuts and mates with an annular shoulder 134 of the burst disk support 34. The example configuration of FIG. 3A includes the sieve 54 and the large volume reaction chamber sleeve 60 described above with regard to FIG. 2A. As shown in FIG. 3B, however, the sieve 54 could be omitted and the reaction chamber sleeve 60 could have an alternative configuration.

In the example configuration of FIG. 3B, the central bore 130 has a smaller diameter than that of the configuration of FIG. 3A, so the volume of the foam fuel propellant 140 is increased. The end portion 132 of the foam fuel propellant 140 abuts with and conforms to the contour of the annular shoulder 134 and adjacent portions of the burst disk support 34. It can thus be seen that the example inflator configurations of FIGS. 3A and 3B allow for the volume of foam fuel propellant 140 to be tailored in two manners, i.e., by increasing or decreasing the length of the propellant or by increasing or decreasing the diameter of the central bore 130. Note also that, for the inflator 10 of FIGS. 3A and 3B, the pressure chamber 80 can have a diameter selected to provide a desired stored gas capacity.

Advantageously, the central bore 130 in the foam fuel propellant 140 provides a space within the mass of propellant in which combustion can take place. The foam fuel propellant 140 of the configurations of FIGS. 3A and 3B can thus take place in an outside-in and an inside-out manner. In case of use of any kind of shock waves it is fact that the foam fuel component, having an open cell construction, does not mean any significant loss in shock wave intensity as described above. Despite this fact it might be advantageous anyway to use the central bore 130 of the configurations of FIGS. 3A and 3B as a kind of channel where the shock waves, indicated by the arrows labled "A" and "B" in FIG. 3A, can propagate through "just gas" by not using the foam fuel propellant 140 as a kind of transmission media to propagate through the inflator 10.

Figure 4A:
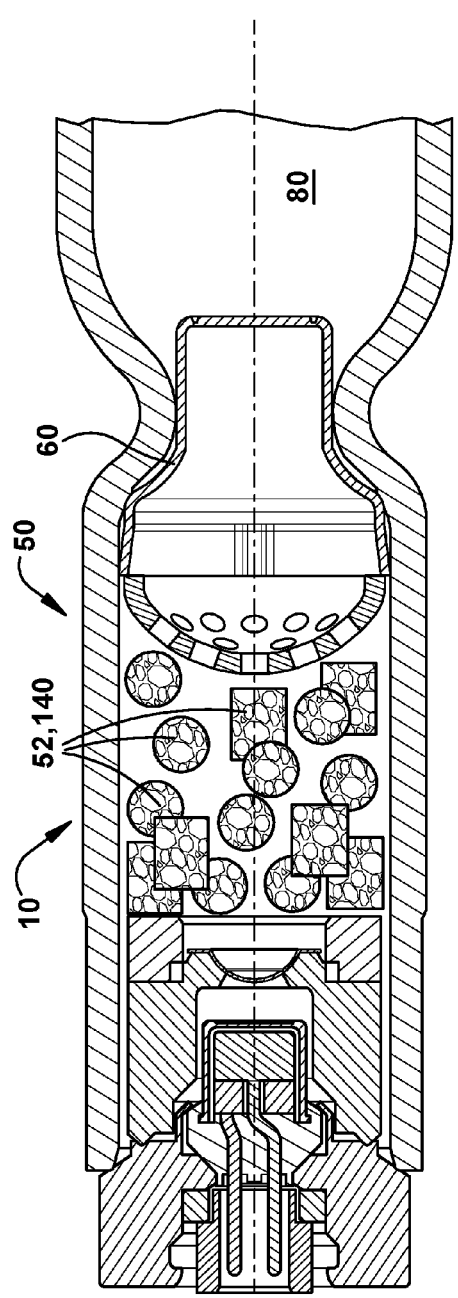
FIGS. 4A-4C are schematic sectional views of a portion of an inflator that is similar to the inflator of FIG. 1, according to other example configurations of the invention.
Figure 4B:
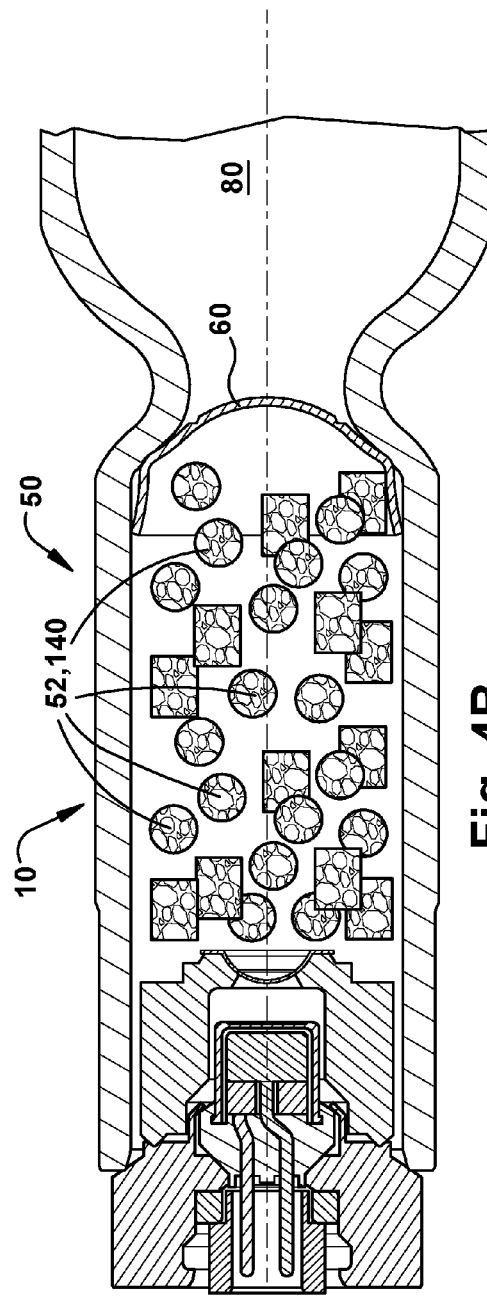
Figure 4C:
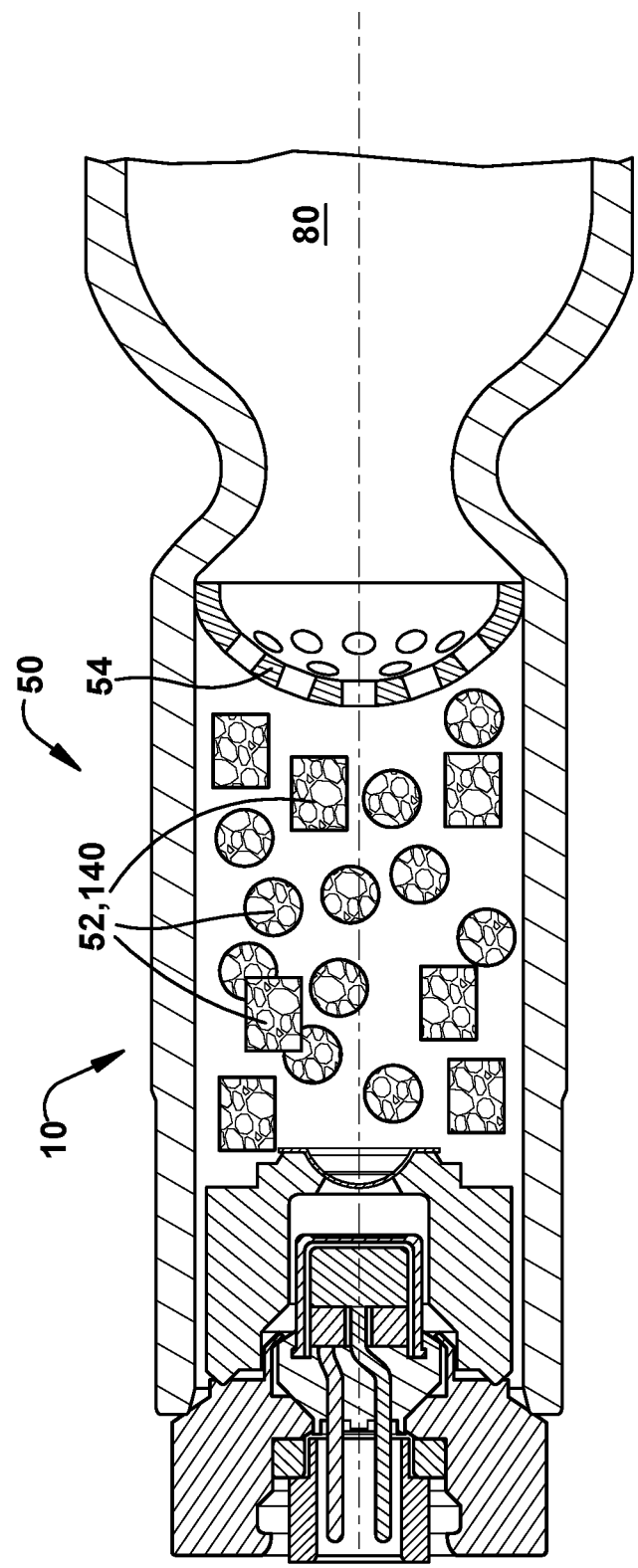

FIGS. 4A-4C illustrate example configurations of the inflator 10 that are similar in structure to previous configurations, the difference being in the configuration of the foam fuel propellant 140. In the example configurations of FIGS. 4A-4C, instead of the foam fuel propellant 140 being a single volume or mass of foam fuel material, the foam fuel propellant is made up of a plurality of smaller foam fuel masses or bodies. The foam bodies that make up the foam fuel propellant 140 can be uniformly shaped and sized or can vary in shape, size, or both shape and size. Although illustrated schematically as being round/spherical and rectangular/cubic in FIGS. 4A-4C, the foam fuel propellant 140 can have any desired shape or shapes, whether regular and uniform or irregular and non-uniform.

The number, size, distribution, and density of the foam bodies of the foam fuel propellant 140 illustrated in FIGS. 4A-4C is meant for purposes of example only and are not indicative of actual number, size, distribution, and density of the foam bodies, which can vary widely, depending on a variety of factors. One potential benefit of this plural foam fuel propellant body configuration is that the multiple foam bodies increases the surface area of the foam body, which could improve the burn rate of the foam fuel propellant 140. For example, this could allow for a more simultaneous outside-in burning of the multiple foam bodies as opposed to a more uniform outside-in or front-to-back burning of a single mass of foam fuel propellant 140.

Another potential benefit of having plural foam bodies make up the foam fuel propellant 140 is that they can be formed of different foam fuel materials, thus allowing for adjusting the burn characteristics of the foam fuel propellant. For example, one foam fuel propellant material could possess better gas generation properties than others, whereas another foam fuel propellant material could possess better heat generation properties than others. These foam fuel propellant materials could be mixed in desired amounts to provide the inflator 10 with the desired gas generating characteristics. In this instance, the foam bodies made from different foam fuel propellants could be identified by a unique shape and/or color.

The inflator 10 of FIG. 4A is constructed similarly to the inflators of FIGS. 2A and 3A, including a sieve 54 and reaction chamber sleeve 60 having the illustrated configurations. The inflator 10 of FIG. 4B is constructed similarly to the inflators of FIGS. 2B and 3B, omitting a sieve and including a reaction chamber sleeve 60 having the illustrated configuration. The inflator 10 of FIG. 4C is a somewhat unique construction in that it omits a reaction chamber sleeve and includes a sieve 54 for supporting the foam fuel propellant 140.

FIGS. 5A-5C illustrate example configurations of the inflator 10 that are similar in structure to previous configurations, the difference being in the configuration of the foam fuel propellant 140. In the example configurations of FIGS. 5A-5C, instead of the foam fuel propellant 140 entirely fills the reaction chamber 50 and, in some configurations, more than the reaction chamber. The example configurations of the inflator 10 illustrated in FIGS. 5A-5C thus represent high loads of foam fuel propellant 140, making these configurations suitable for implementations where high volume gas generation is required. This may be the case, for example, with a passenger frontal air bag that requires a large volume construction in order to occupy the large amount of space between the instrument panel/windshield and a front seated occupant on a passenger side of a vehicle.

Referring to FIG. 5A, the foam fuel propellant 140 fills the entire reaction chamber 50 of the inflator and extends through the narrowing formed by the annular shoulder 56 and into the pressure chamber 80. While illustrated as terminating within the pressure chamber 80, the foam fuel propellant 140 could occupy a greater volume within the pressure chamber up to and including filling the entire pressure chamber. Referring to FIG. 5B, the foam fuel propellant 140 fills the entire reaction chamber 50 of the inflator and extends partially into the narrowing formed by the annular shoulder 56, terminating therein.

The example configuration illustrated in FIG. 5C is similar to the example configuration illustrated in FIG. 5B in that the foam fuel propellant 140 fills the entire reaction chamber 50 of the inflator and extends partially into the narrowing formed by the annular shoulder 56, terminating therein. Referring to FIG. 5C, the inflator 10 includes a reaction chamber sleeve 60. Thus, in this particular configuration, the foam fuel propellant 140 fills the reaction chamber 50 from the burst disk support 34 to the reaction chamber sleeve 60.

Testing has shown that the presence of the foam fuel propellant 140 does not significantly inhibit the propagation of the shock wave through the inflator housing 12. Thus, the presence of the foam fuel propellant 140 in the reaction chamber 50, in the pressure chamber 80, or in both the reaction chamber and the pressure chamber, will not interfere with the propagation of a shock wave through the chamber(s). The shock wave can travel through the foam fuel propellant 140 without losing any strength. In these and other configurations, the foam fuel propellant can act as a physical member that transmits the shock wave through the inflator.

FIG. 6 illustrates an example configuration of the inflator 10 that includes certain elements of other example configurations described above. In particular, the inflator 10 illustrated in FIG. 6 includes a foam fuel propellant 140 that extends the length of the reaction chamber 50 from the burst disk support 34 (annular shoulder 134) to the reaction chamber sleeve 60 and has a plurality of axially extending bores 130.

Advantageously, the bores 130 in the foam fuel propellant 140 provide spaces within the mass of propellant in which combustion can take place. The foam fuel propellant 140 of the example configuration of FIG. 6 can thus take place in both an outside-in and an inside-out manner. The bores 130 through the foam fuel propellant 140 of the example configuration of FIG. 6 could vary in number and size/diameter in order to produce desired performance characteristics. For example, the size and/or number of bores 130 can be selected so that the mass of foam fuel propellant 140 is sufficient to generate combustion products (heat and inflation fluid) in desired amounts. Additionally, the size and/or number of bores 130 can also be selected to control the surface area of the foam fuel propellant 140 in order to help control the burn rate of the propellant.

FIGS. 2A-6 illustrate configurations of the inflator 10 where inflation fluid is generated in the reaction chamber 50 through a combustion reaction only. Thus, in these configurations the foam fuel propellant 140 is the only fuel in the reaction chamber 50 and the oxygen gas, whether pure or a component of a gas mixture, is the only oxidizer. Since the oxygen can permeate throughout the foam fuel propellant 140, the combustion reaction can take place very efficiently. By filling the reaction chamber 50 with an amount of oxygen sufficient to produce a stoichiometric combustion reaction, complete and efficient combustion of the foam fuel propellant 140 can be ensured. Since a stoichiometric reaction can be difficult to achieve, an amount of oxygen that slightly exceeds the theoretical stoichiometric amount can be provided.

Advantageously, the foam fuel propellant 140 can have an energy capacity or density that is much greater than other fuels, and can thereby offer high performance when compared to other gas generating materials. For example, comparing the foam fuel propellant 140 can offer a high energy/performance replacement factor when compared to a conventional pyrotechnic propellant.

In this description, the "energy/performance replacement factor" refers to the amount of one propellant required to replace the energy and gas generating performance of another propellant. For instance, a foam fuel propellant that offers an energy/performance replacement factor 1:10 means that 1 g of the foam fuel propellant can replace/substitute 10 g of pyrotechnic propellant while maintaining a comparable inflator performance. For instance, the energy produced by combustion of a conventional propellant can be about 2-3 kJ/g. In one particular example, a guanidine nitrate pyrotechnic propellant, in composition with an oxidizer, can have an energy density of about 2.8 kJ/g. The energy density of typical open cell foam fuel propellants can be on the order of 20-40 kJ/g (not including the mass of the oxygen gas). In this example, the energy density of the foam fuel propellant is about 7-14 times that of the conventional pyrotechnic propellant.

Foam Fuel Propellant as a Booster for Pyrotechnic Propellants

FIGS. 7A and 7B illustrate example configurations of the inflator 10 in which a pyrotechnic propellant 150, in addition to the foam fuel propellant 140, is used to generate gas/inflation fluid. In the example configuration of FIG. 7A, the foam fuel propellant 140 includes an end portion 152 that abuts the burst disk support 34 and a central, axially extending cylindrical extension 154 that extends basically the length of the reaction chamber, terminating at or near the reaction chamber sleeve 60. In the example configuration of FIG. 7A, the pyrotechnic propellant 150 includes a plurality of ring-shaped disks arranged in an axially extending stack with the extension 154 of the foam fuel propellant 140 extending through axially aligned center holes of the disks.

The example configuration of FIG. 7B is similar to the example configuration of FIG. 7A. In the example configuration of FIG. 7B, the foam fuel propellant 140 includes a second end portion 156 opposite the first end portion 152. The extension 154 extends from the first end portion 152 to the second end portion 156, with the pyrotechnic propellant rings 150 being stacked onto the extension 154 between the end portions 152, 156.

As described previously, the foam fuel propellant 140 is non-pyrotechnic, thus requiring an oxidizer which, in the present case is an oxidizing gas such as oxygen or a gas mixture containing oxygen. As with the other configurations, this oxidizing gas can fill the empty space within the reaction chamber 50, including the open cells of the foam fuel propellant 140. The pyrotechnic propellant 150 is a chemical composition that contains both fuel and oxidizer. When ignited, the pyrotechnic propellant 150 undergoes a self-sustaining chemical reaction, which does not require the oxygen gas.

Advantageously, the foam fuel propellant 140 in the example configurations of FIGS. 7A and 7B acts as a booster charge that promotes the ignition and rapid reaction of the pyrotechnic material. The combustion of the foam fuel propellant with oxygen gas is highly reactive and is easily initiated and sustained. Since the chemical reaction rate of the pyrotechnic propellant 150 increases with heat, the inclusion of the foam fuel propellant 140 and the combustion reaction that it undergoes heats the reaction chamber 50 and the materials, including the pyrotechnic propellant 150, stored therein. This added heat increases or "boosts" the reaction rate of the pyrotechnic propellant 150 and thereby can improve the gas generation characteristics of the inflator 10.

The example configurations of FIGS. 7A and 7B thus include two different gas generating materials. Through careful selection and configuration of these two gas generating materials, the performance of the inflator 10 can be enhanced or improved. For instance, the foam fuel propellant 140 can act as a gas generating material and can also serve as a booster charge that helps to ignite the pyrotechnic propellant 150. The combustion reaction of the foam fuel propellant 140 with the stored oxidizing gas in the reaction chamber 50 can generate heat and inflation fluid, with the heat produced by the reaction helping to ignite the pyrotechnic gas generating rings 150 and promote the resulting reaction.

FIGS. 8A and 8B illustrate example configurations of the inflator 10 that are similar to the configurations of FIGS. 7A and 7B. The fundamental principle of operation of the inflator 10 in FIGS. 8A and 8B is the same as that in FIGS. 7A and 7B, that is, that the foam fuel propellant 140 produces combustion products in the form of heat and inflation fluid, and the heat helps to ignite the pyrotechnic propellant 150 and promote the gas generating rings and promote the resulting reaction.

The differences between the example configurations of FIGS. 7A and 7B and the example configurations of FIGS. 8A and 8B is structural. More specifically, the differences between these example configurations lies primarily, if not solely, with the configurations of the foam fuel propellant 140 and the pyrotechnic propellant 150. In the example configurations of FIGS. 8A and 8B, the foam fuel propellant 140 of the inflator 10 includes a plurality of foam fuel propellant spacers 160. In these configurations, a foam fuel propellant spacer 160 is positioned between each adjacent pair of pyrotechnic propellant rings 150.

In the example configuration of FIG. 8A, the central extension is omitted from the foam fuel propellant 140. A plurality of pyrotechnic rings 150 and foam fuel propellant spacers 160 are stacked in an alternating fashion onto the first end piece 152 of the foam fuel propellant 140. The stack can fill or substantially fill the reaction chamber 50 or any desired portion thereof. In the example configuration of FIG. 8A, the stack extends from the burst disk support 34 to the reaction chamber sleeve 60.

In the example configuration of FIG. 8A, the foam fuel propellant spacers 160 are disc shaped. One of the foam fuel propellant spacers 160 forms the terminal end of the stack and therefore serves as the second end piece 156 of the foam fuel propellant 140. In this sense, the first end piece 152 could also be considered to be a spacer 160.

In the example configuration of FIG. 8B, the foam fuel propellant spacers 160 can include individual central extensions 162 that have a length selected to fill the central openings in the pyrotechnic rings 150. A plurality of pyrotechnic rings 150 and foam fuel propellant spacers 160 are stacked in an alternating fashion onto the first end piece 152 of the foam fuel propellant 140 with the extensions filling the opening in the adjacent pyrotechnic ring 150 in the stack. The stack can fill or substantially fill the reaction chamber 50 or any desired portion thereof. In the example configuration of FIG. 8B, the stack extends from the burst disk support 34 to the reaction chamber sleeve 60. In the example configuration of FIG. 8B, one of the foam fuel propellant spacers 160 forms the terminal end of the stack and therefore serves as the second end piece 156 of the foam fuel propellant 140. In this sense, the first end piece 152 could also be considered to be a spacer 160 and include an extension 162.

The example configurations of FIGS. 8A and 8B thus include two different gas generating materials. Through careful selection and configuration of these two gas generating materials, the performance of the inflator 10 can be enhanced or improved. For instance, the foam fuel propellant 140 can act as a gas generating material and can also serve as a booster charge that helps to ignite the pyrotechnic propellant 150. The combustion reaction of the foam fuel propellant 140 with the stored oxidizing gas in the reaction chamber 50 can generate heat and inflation fluid, with the heat produced by the reaction helping to ignite the pyrotechnic gas generating rings 150 and promote the resulting reaction.

The spacers 160, extending between the propellant rings 150 FIGS. 8A and 8B) and through the central openings in the rings (FIG. 8B only) can help improve the efficiency with which the combustion of the foam fuel propellant 140 ignites the pyrotechnic propellant rings 150. The spacers 160 can additionally serve to help prevent the pyrotechnic rings 150 from rattling inside the inflator 10.

FIGS. 9A and 9B illustrate an example configuration of the inflator 10 that includes certain elements of other example configurations described above. In particular, the inflator 10 illustrated in FIGS. 9A and 9B includes a foam fuel propellant 140 that extends the length of the reaction chamber 50 from the burst disk support 34 to the reaction chamber sleeve 60 and has a plurality of axially extending bores 130.

The fundamental principle of operation of the inflator 10 in FIGS. 9A and 9B is the same as that in FIGS. 7A-8B, that is, that the foam fuel propellant 140 produces combustion products in the form of heat and inflation fluid, and the heat helps to ignite the pyrotechnic propellant 150 and promote the gas generating rings and promote the resulting reaction. Again, the differences with the example configurations of FIGS. 9A and 9B is structural. More specifically, the differences between these example configurations lies primarily, if not solely, with the configurations of the foam fuel propellant 140 and the pyrotechnic propellant 150.

In the example configuration of FIGS. 9A and 9B, the inflator 10 also includes a pyrotechnic propellant 150, in addition to the foam fuel propellant 140, that generates heat and inflation fluid. The pyrotechnic propellant 150 is provided in the form of a plurality of pellets that are placed or stacked within the bores 130 in the foam fuel propellant 140. As shown in the figures, the pyrotechnic propellant pellets 150 can be generally flat and cylindrical in form. The pellets 150 can be dimensioned to form an interference with the cylindrical bores 130 so that the foam fuel propellant 140 deforms slightly and hold the pellets in place and maintain a desired amount of spacing between the pellets.

Alternatively, the pyrotechnic propellant pellets 150 could be formed with spherical end surfaces or projections (not shown) to maintain the spacing between the pellets. As another alternative, instead of pellets, the pyrotechnic propellant 150 could be an extruded mass, for example, an extruded cylindrical mass, that is sized to fit within the bores 130. As another example, an extruded mass of pyrotechnic propellant 150 could include axially extending ribs in order to increase the surface area of the propellant.

The example configuration of FIGS. 9A and 9B thus includes two different gas generating materials. Through careful selection and configuration of these two gas generating materials, the performance of the inflator 10 can be enhanced or improved. For instance, the foam fuel propellant 140 can act as a gas generating material and can also serve as a booster charge that helps to ignite the pyrotechnic propellant 150. The combustion reaction of the foam fuel propellant 140 with the stored oxidizing gas in the reaction chamber 50 can generate heat and inflation fluid, with the heat produced by the reaction helping to ignite the pyrotechnic gas generating rings 150 and promote the resulting reaction.

FIG. 10 illustrate an example configuration of the inflator 10 that includes certain elements of example configurations described above. In particular, the inflator 10 illustrated in FIG. 10 includes a foam fuel propellant 140 and a pyrotechnic propellant 150, both of which are made up of a plurality of smaller propellant masses or bodies. The foam and pyrotechnic bodies that make up the foam fuel propellant 140 can be uniformly shaped and sized or can vary in shape, size, or both shape and size.

The fundamental principle of operation of the inflator 10 in FIG. 10 is the same as that in FIGS. 7A-9B, that is, that the foam fuel propellant 140 produces combustion products in the form of heat and inflation fluid, and the heat helps to ignite the pyrotechnic propellant 150 and promote the gas generating rings and promote the resulting reaction. Again, the differences with the example configurations of FIG. 10 is structural.

The number, size, distribution, and density of both the foam fuel propellant 140 bodies and the pyrotechnic propellant 150 bodies illustrated in FIG. 10 is meant for purposes of example only and are not indicative of actual number, size, distribution, and density of the bodies, which can vary widely, depending on a variety of factors. One potential benefit of this plural propellant body configuration is that the multiple bodies increases the surface area of the respective propellants, which could improve their respective burn rates. For example, this could allow for a more simultaneous outside-in burning of the propellant bodies as opposed to a more uniform outside-in or front-to-back burning of a single mass propellant.

Acting as a booster for promoting the reaction of the pyrotechnic propellant 150 bodies, mixing the foam fuel propellant 140 allows for the heat resulting from its combustion to be distributed throughout the reaction chamber 50.

FIGS. 11A-11C illustrate example configurations of the inflator 10 in which an additive is embedded into the foam fuel propellant 140. The additive can be a pyrotechnic propellant 150, a reaction modifier 170, or both a pyrotechnic propellant and a reaction modifier. The reaction modifier 170 can, for example, be a catalyst or a burn rate modifier. Examples of materials that can be used as a catalyst/burn rate modifier are metals, such as powdered aluminum, metal oxides, such as copper oxide, boron hydrides, soot, or a combination thereof.

The only differences in the example configurations of FIGS. 11A-11C are those relating to the structure of the inflator components and the size of the pyrotechnic body of foam 52, pyrotechnic propellant 150, and additives 170. In FIG. 11A, the inflator 10 includes both a sieve 54 and a reaction chamber sleeve 60. In this configuration, the sieve 54 can help collect slag formed due to the burning of any reaction modifiers 170. In FIG. 11B, the inflator 10 includes only a reaction chamber sleeve 60. In FIG. 11C, the inflator 10 includes neither a sieve nor a reaction chamber sleeve.

The foam fuel propellant 140 is non-pyrotechnic, thus requiring an oxidizer which, in the present case is an oxidizing gas such as oxygen or a gas mixture containing oxygen. Metal additives may also require an oxidizer. As with the other configurations, this oxidizing gas can fill the empty space within the reaction chamber 50, including the open cells of the foam fuel propellant 140.

The example configurations of FIGS. 11A-11C thus include at least two different gas generating materials. Through careful selection and configuration of these gas generating materials, the performance of the inflator 10 can be enhanced or improved. For instance, the foam fuel propellant 140 can act as a gas generating material and can also serve as a booster charge that helps to ignite and promote the reaction of the pyrotechnic propellant 150. The reaction modifiers 170 can help enforce or promote the ignition characteristics of the foam fuel propellant 140, especially where the foam is used to ignite and boost the pyrotechnic propellant 150.

FIGS. 12A and 12B illustrate an example configuration of the inflator 10 that includes certain elements of example configurations described above. In particular, the inflator 10 illustrated in FIGS. 12A and 12B includes a combination of a foam fuel propellant 140 and a pyrotechnic propellant 150. In the configurations of FIGS. 12A and 12B, the foam fuel propellant 140 is configured to leave a space 172 within the reaction chamber 50 that is at least partially bounded by the foam. In FIG. 12A, the space 172 is bounded on opposite ends by the foam fuel propellant 140. In FIG. 12B, the space 172 is surrounded by the foam fuel propellant 140.

The pyrotechnic propellant 150 is provided in the form of a plurality of pellets that are positioned within the space 172. The pyrotechnic propellant pellets 150 can be placed in the space 172 in an ordered fashion, e.g., stacked, or can be placed in the space at random, as shown, to fill the space. As shown in the figures, the pyrotechnic propellant pellets 150 can be generally flat and cylindrical in form. The pellets 150 can, however, have alternative configurations, such as spherical, cubic, polyhedral, etc.

The example configuration of FIGS. 12A and 12B thus includes two different gas generating materials. Through careful selection and configuration of these two gas generating materials, the performance of the inflator 10 can be enhanced or improved. For instance, the foam fuel propellant 140 can act as a gas generating material and can also serve as a booster charge that helps to ignite the pyrotechnic propellant 150. Indeed, the foam fuel propellant 140, being positioned adjacent the initiator, is ideally positioned to boost the ignition of the pyrotechnic propellant 150. The combustion reaction of the foam fuel propellant 140 with the stored oxidizing gas in the reaction chamber 50 can generate gases, while the heat produced by the reaction can help ignite and promote/sustain the reaction of the pyrotechnic pellets 150.

Figure 13:
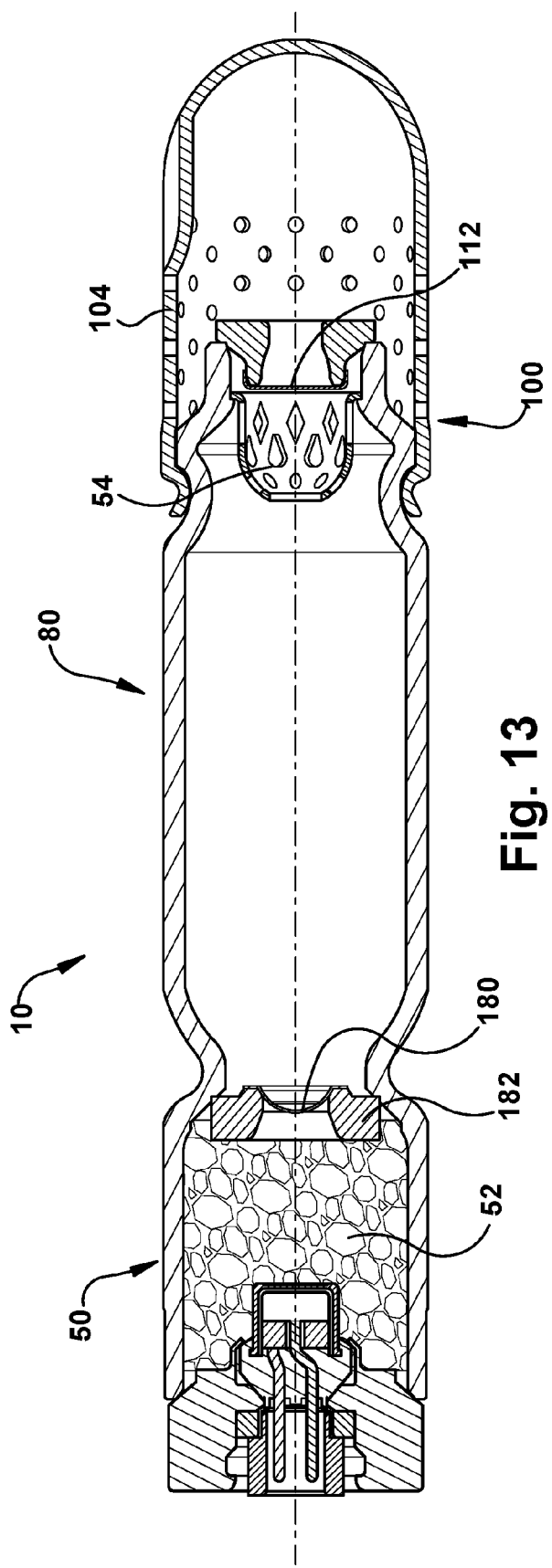
FIG. 13 is a schematic sectional view of a portion of an inflator that has a configuration and construction that differs from that of the inflator of FIG. 1, according to another example configuration of the invention.

FIG. 13 illustrates an alternative construction of the inflator 10. The inflator 10 of FIG. 13 is similar to previous configurations in that it includes a reaction chamber 50 and a pressure chamber 80. In the example configuration of FIG. 13, the reaction chamber 50 and the pressure chamber 80 are separated by a conventional burst disk 180 and burst disk support 182. A reaction chamber sleeve is omitted in this configuration, while the sieve 54 is relocated to the outlet portion 100 of the inflator 10 adjacent the burst disk 112 and diffuser 104.

The inflator 10 of FIG. 13 thus represents a hybrid inflator in which the reaction chamber 50 and pressure chamber 80 are isolated from each other regarding gas-tightness which means they are capable of storing a gas or gases under pressure. In other words, the reaction chamber 50 and the pressure chamber 80 can each on its own enclose gas under a certain pressure. Whereby it is further possible that each chamber 50, 80 can enclose its own type of gas or mixture of gas which can differ from each other. In this hybrid inflator configuration, the propellant 52 can have any composition described herein and thus can include one or more foam fuel propellants, one or more pyrotechnic propellants, and one or more reaction modifiers in any combination. The gases stored in the reaction chamber 50 and the pressure chamber 80 can also have any composition described herein as well.

FIGS. 14A-14D illustrate different configurations for the foam fuel propellant 140 that can be implemented in any of the configurations disclosed herein. Those skilled in the art will appreciate that some of these foam fuel propellant configurations may be more readily adaptable to certain inflator configurations than others.

Referring to FIG. 14A, the foam fuel propellant 140 can be a mass of open cell foam, as depicted in the configurations of the inflator 10 thus far. The foam fuel propellant 140, being a mass of open cell foam, includes gas pockets that are defined by very thin layers of the foamed polymer material (e.g., polypropylene, polyurethane, etc) that forms the cell walls. Due to their open cell configurations/constructions, most of these gas pockets are in fluid communication with each other, and fluid can flow essentially freely through the foam, moving from cell to cell. In this open cell foam configuration, all or substantially all of the cells in the foam can be fluidly connected with each other, either directly or indirectly.

Referring to FIG. 14B, the foam fuel propellant 140 is formed as an extrusion in which the foamed polymer forms a uniform structure, such as a matrix or honeycomb structure. In a matrix structure, a plurality of small channels 190 having rectangular or square cross-section are extruded into the foam mass and extend along its length. In a honeycomb structure, those channels 190 have for example a hexagonal cross-section. In this configuration, it is important to note that the side walls of the channels 190 themselves are formed from the open cell foamed polymer material. Thus, gas can permeate and pass through the both the side walls and the outer wall 192 of the extruded mass of foam fuel propellant 140.

Referring to FIG. 14C, the foam fuel propellant 140 is formed as a sheet 194 of open cell foam polymer material that is rolled-up to form a foamed polymer roll 196. As shown in FIG. 14C, the foam polymer sheet 194 can have a series of projections 198 extending from one or both surfaces that serve to space the overlying layers of the sheet 194 in order to create space between the layers in which gas can collect. Additionally, since the sheet 194 itself is formed from an open cell polymer foam, the gas can also permeate the sheet 194 and pass from layer to layer in the foamed polymer roll 196.

Referring to FIG. 14D, the foam fuel propellant 140 is implemented in a stack 200 in which separate blocks or masses 202 of the foamed polymer propellant are stacked alternately with layers of foil 204, such as a plastic foil or metal foil. A plastic foil 204 can, for example, be formed of a non-foamed, i.e., solid, polymer, such as the same polymer that is foamed to form the foamed blocks 202 or a polymer different than that used to form the blocks. A metal foil 204 can, for example, be a thin aluminum foil. In this configuration, the foil layers 204 can affect (i.e., slow) the burn rate of the foam fuel propellant 140 by slowing the propagation of the combustion reaction throughout the foamed propellant blocks 202. Therefore, by selecting the number, thickness, material, etc. of the foil layers 204, and the foam properties (material, cell size, cell wall thickness) of the foam fuel propellant blocks 202, the burn rate of the stack 200 as a whole can be tailored to meet specific design criteria.

Figure 15:
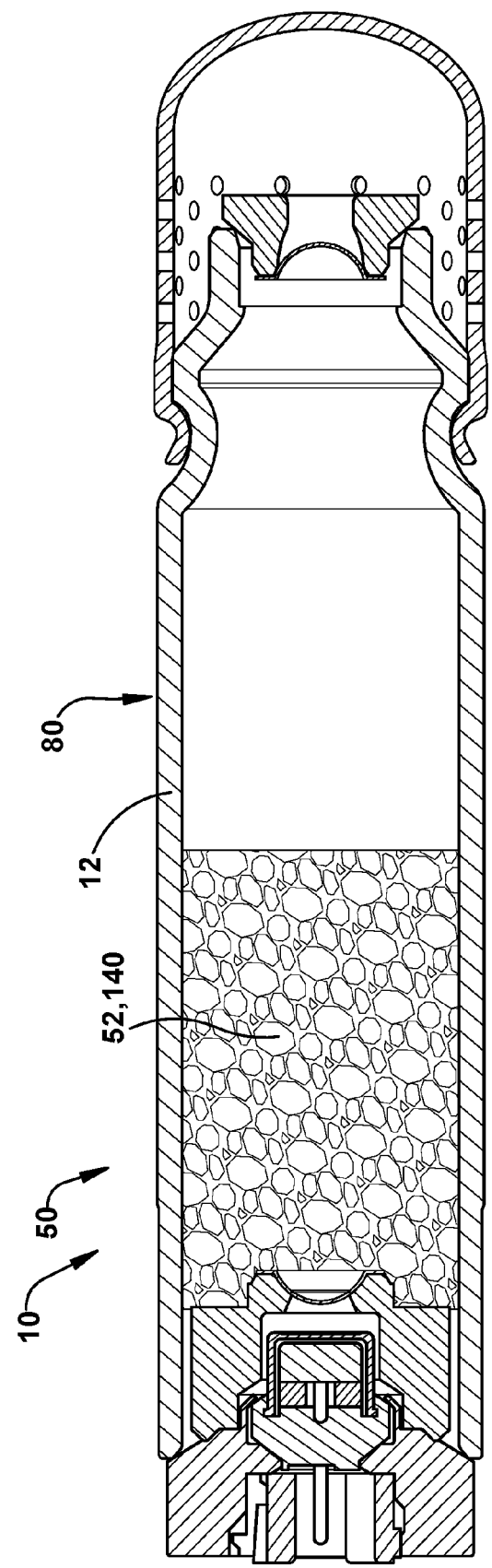
FIG. 15 is a schematic sectional view of a portion of an inflator that has a configuration and construction that differs from that of the inflator of FIG. 1, according to another example configuration of the invention.

FIG. 15 illustrates a construction of the inflator 10 that can be implemented in any configuration in which there is no separation between the reaction chamber 50 and the pressure chamber 80. The inflator 10 in this instance omits a reaction chamber sleeve and any other chamber separating structure, so there is no need for an annular shoulder between the reaction chamber 50 and the pressure chamber 80. The housing 12 can thus be uniform and cylindrical along these portions of the inflator 10.

In this configuration, like other configurations where there is no separation between the reaction chamber and pressure chamber 80, the gas stored in the inflator can be a mixture of oxidizing gas or gases (i.e., containing oxygen) and inert gas or gases (e.g., helium, argon, or a mixture of helium and argon). The gas mixture would, of course have to contain enough oxygen to support combustion of the foam fuel propellant. In this manner, a hybrid inflator 10 utilizing foam fuel propellant 140 to heat and pressurize a gas mixture including inert component can be obtained in a simplified structure.

Additionally, in the example configuration of FIG. 15, the foam fuel propellant 140 is shown as the only component of the propellant 52. The propellant 52 can, however, have any composition described herein and thus can include one or more foam fuel propellants, one or more pyrotechnic propellants, and one or more reaction modifiers in any combination. The gases stored in the reaction chamber 50 and the pressure chamber 80 can also have any composition described herein as well, keeping in mind that there is no separation between these chambers.

From the above description of the invention, those skilled in the art will perceive applications, improvements, changes and modifications to the invention. Such applications, Having described the invention, we claim the following:

1. An inflator that is actuatable to provide inflation fluid for inflating an inflatable vehicle occupant protection device, the inflator comprising:
   a volume of stored gas stored at a pressure of al least 5000 psi; and
   a propellant that is ignitable to undergo a reaction that produces reaction products, the reaction products comprising heat and gas that mix with the stored gas to produce a mixture of inflation fluid, the inflator being configured to discharge the inflation fluid to inflate the protection device,
   wherein the propellant comprises an open cell foam fuel propellant, the reaction comprising a combustion reaction in which the foam fuel propellant reacts with a gas oxidizer comprising oxygen to produce heat and gas reaction products that mix with the stored gas.

2. The inflator recited in claim 1, wherein the propellant further comprises a pyrotechnic propellant comprising a chemical composition, the reaction further comprising a self-sustaining chemical reaction in which a fuel component of the chemical composition reacts with an oxidizer component of the chemical composition to produce heat and gas reaction products that mix with the stored gas.

3. The inflator recited in claim 1, wherein the foam fuel propellant comprises a foam polyhydrocarbon, carbonhydretes or polyolefin material.

4. The inflator recited in claim 1, wherein the foam fuel propellant comprises at least one of a polyether, polyester, polystyrene, polypropylene, polyethylene, and polyurethane material.

5. The inflator recited in claim 1, wherein the propellant further comprises reaction modifiers comprising at least one of aluminum, titanium, silicon, magnesium, aluminum metal oxides, titanium metal oxides, silicon metal oxides, magnesium metal oxides, aluminum alloys, titanium alloys, silicon alloys, magnesium alloys, an magnesium-aluminum alloy, all in at least one of granular, flaked, and powdered form, boron hydrides, and soot.

6. The inflator recited in claim 1, further comprising a housing defining a reaction chamber for containing the propellant and the gas oxidizer, and a pressure chamber for containing the stored gas, the reaction chamber and the pressure chamber being separated by a first closure member that is rupturable in response to actuation of the inflator to permit the reaction products produced by the propellant to mix with the stored gas in the pressure chamber.

7. The inflator recited in claim 6, further comprising an igniter that is actuatable to ignite the propellant in the reaction chamber, the igniter being configured to produce a shock wave when actuated, and wherein the foam fuel propellant in the reaction chamber is configured to permit the shock wave to propagate through the reaction chamber without a significant loss of intensity, the shock wave acting on and rupturing the first closure member separating the reaction chamber from the pressure chamber, thereby allowing the reaction products to enter the pressure chamber and mix with the stored gas.

8. The inflator recited in claim 7, further comprising an inflator outlet portion positioned at an end of the pressure chamber opposite the first closure member, and a second closure member that closes the inflator outlet, wherein the shock wave produced by actuation of the igniter is configured to also propagate through the pressure chamber and rupture the second closure member after rupturing the first closure member.

9. The inflator recited in claim 8, further comprising an inflator outlet portion positioned at an end of the pressure chamber opposite the first closure member, and a second closure member that closes the inflator outlet, wherein the first closure member is configured to produce a shock wave in response to being ruptured, the shock wave produced by rupture of the first closure member propagating through the pressure chamber and rupturing the second closure member.

10. The inflator recited in claim 6, wherein the first closure member provides a gas permeable seal between the reaction chamber and the pressure chamber.

11. The inflator recited in claim 1, wherein the propellant comprises foam fuel propellant only.

12. The inflator recited in claim 1, wherein the foam fuel propellant is compressed in a reaction chamber or the inflator and conforms to the inflator structures in the reaction chamber.

13. The inflator recited in claim 12, wherein the foam fuel propellant does not fill the entire reaction chamber, and wherein the foam fuel propellant is held in place in the reaction chamber by at least one of adhesives and a frictional engagement resulting from the foam being compressed within the reaction chamber.

14. The inflator recited in claim 11, wherein the volume of the foam fuel propellant is selected to tailor the output of the inflator without adjusting the structure of the inflator to accommodate the selected volume.

15. The inflator recited in claim 11, wherein the foam fuel propellant fills an entire reaction chamber of the inflator.

16. The inflator recited in claim 11, wherein the foam fuel propellant comprises one or more bores that extend through the foam fuel propellant.

17. The Inflator recited in claim 11, wherein the foam fuel propellant comprises a single mass of foam fuel propellant material.

18. The inflator recited in claim 11, wherein the foam fuel propellant comprises a plurality of foam fuel propellant bodies.

19. The inflator recited in claim 18, wherein different ones of the foam fuel propellant bodies are made of different types of foam fuel propellant material.

20. The inflator recited in claim 19, wherein the foam fuel propellant bodies have at least one of shapes and colors that correspond to the type of foam fuel propellant material from which the bodies are constructed.

21. The inflator recited in claim 1, wherein the stored gas, the propellant, and the oxidizing gas are all stored in a single chamber in the inflator, wherein the stored gas and the oxidizing gas comprise a gas mixture including oxygen and at least one inert gas.

22. The inflator recited in claim 2, wherein the pyrotechnic propellant comprises a plurality of pyrotechnic, propellant rings arranged axially in a stacked configuration in the inflator.

23. The inflator recited in claim 22, wherein the pyrotechnic propellant rings comprise aligned central openings, the foam fuel propellant comprising a cylindrical portion that extends through the aligned central openings.

24. The Inflator recited in claim 22, wherein the pyrotechnic propellant rings are spaced from each other axially in the inflator, and wherein the foam fuel propellant comprises disc shaped spacers positioned between the pyrotechnic propellant rings.

25. The inflator recited in claim 22, wherein the pyrotechnic propellant rings are spaced from each other axially in the inflator and comprise aligned central openings, and wherein the foam fuel propellant comprises disc shaped spacers positioned between the pyrotechnic propellant rings and cylindrical portions that extend through the aligned central openings.

26. The inflator recited in claim 2, wherein the tom fuel propellant comprises one or more bores that extend through the foam fuel propellant, and wherein the propellant comprises a plurality of pyrotechnic propellant tablets that are supported in the bores through an interference fit in which the tablets deform the foam fuel propellant walls defining the bores.

27. The inflator recited in claim 2, wherein the foam fuel propellent comprises a plurality of foam fuel propellant bodies and the pyrotechnic propellant comprises a plurality of pyrotechnic propellant bodies, wherein the foam fuel propellant bodies and the pyrotechnic propellant bodies are placed in a mixture in the inflator.

28. The inflator recited in claim 2, wherein the foam fuel propellant comprises a body of team fuel propellant and the pyrotechnic propellant comprises a plurality of pyrotechnic propellant bodies embedded in the foam fuel propellant.

29. The inflator recited in claim 2, wherein the foam fuel propellant defines a space within the inflator for containing the pyrotechnic propellant, wherein the pyrotechnic propellant comprises a plurality of pyrotechnic propellant tablets that are supported in the space.

30. The inflator recited in claim 29, wherein the pyrotechnic propellant tablets fill the space.

31. The inflator recited in claim 29, wherein the foam fuel propellant defines all sides of the space and thereby surrounds the pyrotechnic propellant tablets that are supported in the space.

32. The inflator recited in claim 1, wherein the foam fuel propellant is formed as an extrusion in which the foamed polymer forms a uniform structure in the form of a matrix or honeycomb structure that define a plurality of small extruded channels that extend along its length.

33. The inflator recited in claim 1, wherein the foam fuel propellant is formed as a sheet of open cell foam polymer material that is rolled-up to form a foamed polymer roll.

34. The inflator recited in claim 33, wherein the foam polymer sheet comprises a series of projections extending from one or both surfaces of the sheet that serve to space the overlying layers of the sheet in order to create space between the layers in which gas can collect.

35. The inflator recited in claim 1, wherein the foam fuel propellant is formed as a stack in which separate masses of foamed polymer propellant are stacked alternately with layers of foil that affect the burn rate of the foam fuel propellant.

36. The inflator recited in claim 1, wherein the foam fuel propellant is formed as a stack of separate masses of foamed polymer propellant, wherein the masses have different mechanical or chemical properties that affect the burn rate of the foam fuel propellant.

37. An inflator that is actuatable to provide inflation fluid for inflating an inflatable vehicle occupant protection device, the inflator comprising:
  a volume of stored gas stored at a pressure of at least 5000 psi;
  a propellant that is ignitable to undergo a reaction that produces reaction products, the reaction products comprising heat and gas that mix with the stored gas to produce a mixture of inflation fluid, the inflator being configured to discharge the inflation fluid to inflate the protection device, the propellant comprising an open cell foam fuel propellant, the reaction comprising a combustion reaction in which the foam fuel propellant reacts with a gas oxidizer comprising oxygen to produce heat and gas reaction products that mix with the stored gas;
  a housing defining a reaction chamber for containing the propellant and the gas oxidizer, and a pressure chamber for containing the stored gas, the reaction chamber and the pressure chamber being separated by a first closure member that is rupturable in response to actuation of the inflator to permit the reaction products produced by the propellant to mix with the stored gas in the pressure chamber; and
  an igniter that is actuatable to ignite the propellant in the reaction chamber, the igniter being configured to produce a shock wave when actuated, and wherein the foam fuel propellant in the reaction chamber is configured to permit the shock wave to propagate through the reaction chamber without a significant loss of intensity, the shock wave acting on and rupturing the first closure member separating the reaction chamber from the pressure chamber, thereby allowing the reaction products to enter the pressure chamber and mix with the stored gas.

38. An inflator that is actuatable to provide inflation fluid for inflating an inflatable vehicle occupant protection device, the inflator comprising:
  a volume of stored gas stored at a pressure of at least 5000 psi;
  a propellant that is ignitable to undergo a reaction that produces reaction products, the reaction products comprising heat and gas that mix with the stored gas to produce a mixture of inflation fluid, the inflator being configured to discharge the inflation fluid to inflate the protection device, the propellant comprising an open cell foam fuel propellant, the reaction comprising a combustion reaction in which the foam fuel propellant reacts with a gas oxidizer comprising oxygen to produce heat and gas reaction products that mix with the stored gas;
  a housing defining a reaction chamber for containing the propellant and the gas oxidizer, and a pressure chamber for containing the stored gas, the reaction chamber and the pressure chamber being separated by a first closure member that is rupturable in response to actuation of the inflator to permit the reaction products produced by the propellant to mix with the stored gas in the pressure chamber; and
  an inflator outlet portion positioned at an end of the pressure chamber opposite the first closure member, and a second closure member that closes the inflator outlet, wherein the first closure member is configured to produce a shock wave in response to being ruptured, the shock wave produced by rupture of the first closure member propagating through the pressure chamber and rupturing the second closure member.

* * * * *